United States Patent
Sang et al.

(10) Patent No.: US 10,484,964 B2
(45) Date of Patent: Nov. 19, 2019

(54) SYSTEM AND METHOD FOR IMPROVING PAGING

(71) Applicant: Futurewei Technologies, Inc., Plano, TX (US)

(72) Inventors: Aimin Justin Sang, San Diego, CA (US); Nathan Edward Tenny, Poway, CA (US); Haibo Xu, Beijing (CN); Kai Xu, Beijing (CN); Hongcheng Zhuang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/844,130

(22) Filed: Dec. 15, 2017

(65) Prior Publication Data

US 2019/0045481 A1 Feb. 7, 2019

Related U.S. Application Data

(60) Provisional application No. 62/540,429, filed on Aug. 2, 2017.

(51) Int. Cl.
*H04W 68/02* (2009.01)
*H04B 1/7156* (2011.01)
(Continued)

(52) U.S. Cl.
CPC .......... *H04W 68/02* (2013.01); *H04B 1/713* (2013.01); *H04B 1/7156* (2013.01);
(Continued)

(58) Field of Classification Search
CPC ..... H04W 68/02; H04W 76/12; H04W 76/14; H04W 76/15; H04W 76/16; H04B 7/0617; H04B 1/713; H04B 1/7156
See application file for complete search history.

(56) References Cited

U.S. PATENT DOCUMENTS 9,037,150 B1 * 5/2015 Vivanco ............ H04W 72/0486
455/451
9,847,863 B2 * 12/2017 Larsson ................ H04W 68/02
(Continued)

FOREIGN PATENT DOCUMENTS

| CN | 104380818 A | 2/2015 |
|---|---|---|
| WO | 2014187289 A1 | 11/2014 |
| WO | 2016182662 A1 | 11/2016 |

OTHER PUBLICATIONS

Huawei, et al., "General aspects for NR HF cell," Agenda Item 9.4, 3GPP TSG-RAN2 Meeting, #95bis, R2-166910, Kaohsiung, Taiwan, Oct. 10-14, 2016, 5 pages.
(Continued)

*Primary Examiner* — Magdi Elhag
(74) *Attorney, Agent, or Firm* — Slater Matsil, LLP

(57) ABSTRACT

A method for paging a first device by a second device includes sending, by the second device, a page message on a first path connecting the second device to the first device, and receiving, by the second device from the first device, a page response in response to the page message on a second path connecting the first device to the second device, wherein the first path and the second path are intentionally selected to be different in at least one of a number of hops in each path, radio access technology, cell or frequency carrier comprising each path, or width of beam pairs forming each path.

53 Claims, 14 Drawing Sheets

(51) Int. Cl.

| | | |
|---|---|---|
| *H04W 76/12* | (2018.01) | |
| *H04W 76/14* | (2018.01) | |
| *H04B 1/713* | (2011.01) | |
| *H04B 7/06* | (2006.01) | |
| *H04W 76/28* | (2018.01) | |
| *H04W 56/00* | (2009.01) | |

(52) U.S. Cl.
CPC .......... *H04B 7/0617* (2013.01); *H04W 76/12* (2018.02); *H04W 76/14* (2018.02); *H04W 56/0015* (2013.01); *H04W 76/28* (2018.02)

(56) References Cited

U.S. PATENT DOCUMENTS

| | | | |
|---|---|---|---|
| 2014/0003397 A1 | 1/2014 | Goyal et al. | |
| 2016/0227456 A1* | 8/2016 | Goyal | H04W 72/0446 |
| 2016/0323756 A1* | 11/2016 | Shen | H04W 16/28 |
| 2017/0250764 A1* | 8/2017 | Wen | H04B 7/26 |
| 2018/0048442 A1* | 2/2018 | Sang | H04B 17/318 |
| 2018/0192384 A1* | 7/2018 | Chou | H04W 56/001 |
| 2018/0199328 A1* | 7/2018 | Sang | H04L 5/0048 |
| 2019/0110330 A1* | 4/2019 | Wang | H04L 67/18 |

OTHER PUBLICATIONS

Huawei, et al., "Low frequency assisted high frequency operation," Agenda Item 9.2.2.4, 3GPP TSG-RAN WG2 Meeting #95bis, R2-166911, Kaohsiung, Taiwan, Oct. 10-14, 2016, 6 pages.

Huawei, et al., "Uplink based mobility in high frequency RRC_Inactive state," Agenda Item 9.3.1.3, 3GPP TSG RAN WG2 Meeting #96, R2-168567, Reno, Nevada, Nov. 14-18, 2016, 7 pages.

Huawei, et al., "Inter-cell mobility without RRC signaling," Agenda Item 10.3.1.1.2, 3GPP-TSG-RAN WG2 #97, R2-1701797, Athens, Greece, Feb. 13-17, 2017, 1 page.

Huawei, et al., "Low frequency assisted high frequency operations," Agenda Item 10.2.3.5, 3GPP TSG-RAN WG2 Meeting #97bis, R2-1703550, Spokane, Washington, Apr. 3-7, 2017, 6 pages.

Huawei, et al., "General aspects for NR high frequency cells," 3GPP TSG-RAN WG2 #97bis, R2-1703551, Agenda Item 10.2.3.5, Spokane, Washington, Apr. 3-7, 2017, 5 pages.

Samsung, "Paging in NR—Beamforming Aspects," 3GPP TSG-RAN WG2 NR#2, R2-1706537, Revision of R2-1704066, Qingdao, China, Jun. 27-29, 2017, 4 pages.

Ericsson, "Paging delivery in NR," Agenda Item 10.4.2.6, 3GPP TSG-RAN WG2 Ad Hoc on NR, Tdoc R2-1706637, Revision of R2-1704762, Qingdao, China, Jun. 27-29, 2017, 3 pages.

Ericsson, "Response-driven paging to reduce beam sweeping overhead in NR," Agenda Item 10.4.2.6, 3GPP TSG-RAN WG2 Ad Hoc on NR#2, Tdoc R2-1706638, Resubmission of R2-1704763, Qingdao, China, Jun. 27-29, 2017, 3 pages.

Huawei, et al., "RAN initiated Paging," Agenda Item 10.4.1.6.3, 3GPP TSG-RAN WG2 AdHoc, R2-1706737 revision of R2-1704888, Qingdao, China, Jun. 27-29, 2017, 3 pages.

Huawei, et al., "Paging mechanism with beam sweeping," Agenda Item 10.4.2.6, 3GPP TSG-RAN WG2#NR Adhoc 2, R2-1706744, Qingdao, China, Jun. 27-29, 2017, 2 pages.

Mediatek, Inc., "RAN-initiated Paging in NR," Agenda Item 10.4.1.6.3, 3GPP TSG-RAN WG2 Meeting NR AH #2, R2-1706759, Qingdao, China, Jun. 27-29, 2017, 2 Pages.

Mediatek, Inc., "Overhead Reduction for Paging in Multi-beam Operation," Agenda Item 10.4.2.6, 3GPP TSG-RAN WG2 Meeting NR AH#2, R2-1706761, Qingdao, China, Jun. 27-29, 2017, 5 pages.

* cited by examiner

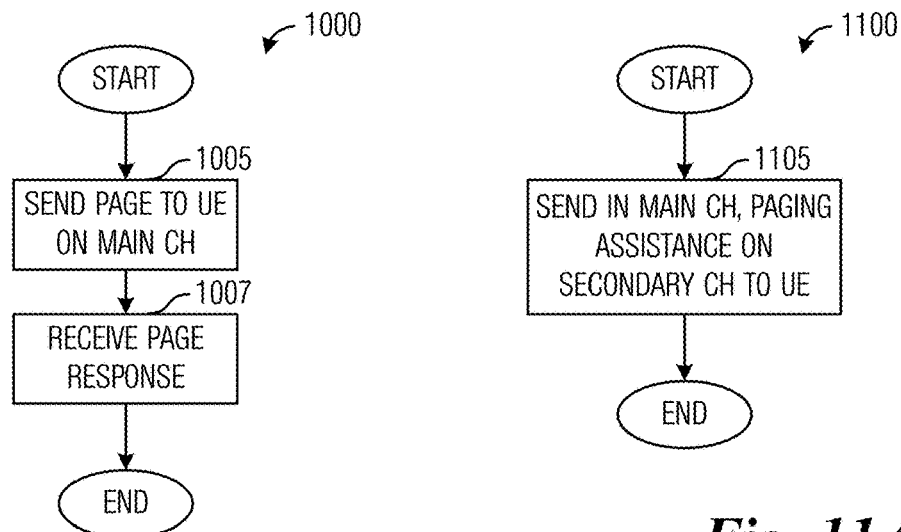
*Fig. 10A*
*Fig. 11A*
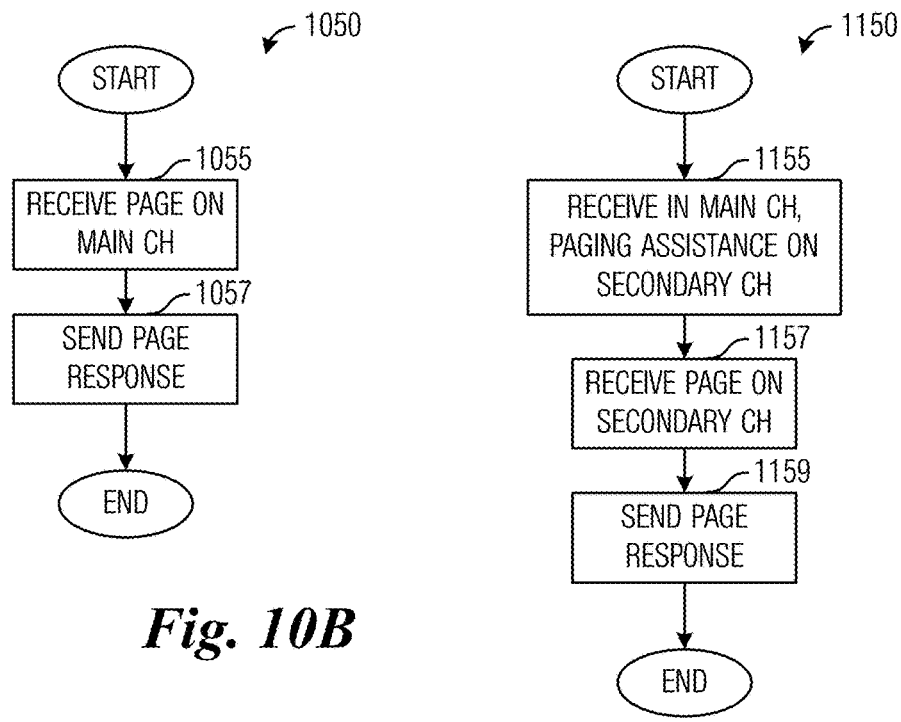
*Fig. 10B*
*Fig. 11B*

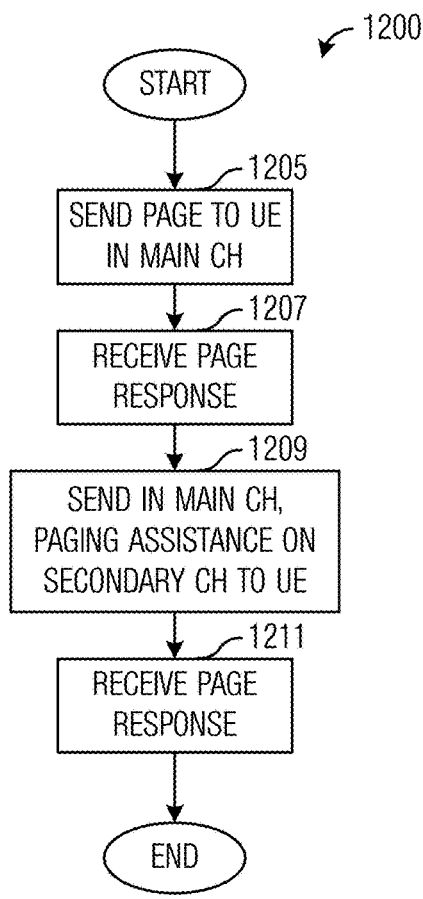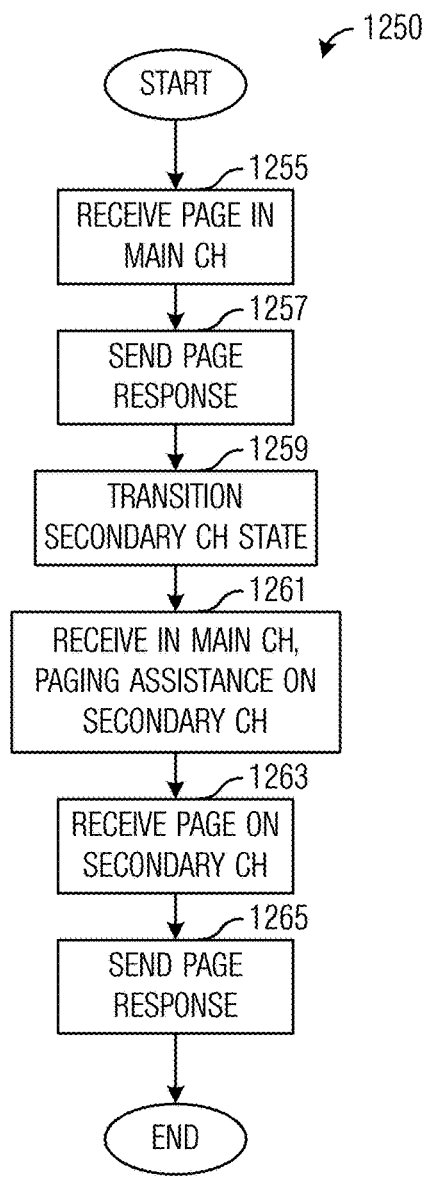
Fig. 12A
Fig. 12B

SYSTEM AND METHOD FOR IMPROVING PAGING

This application claims the benefit of U.S. Provisional Application No. 62/540,429, filed on Aug. 2, 2017, entitled "System and Method for Improving Paging with Assistance," which application is hereby incorporated herein by reference.

TECHNICAL FIELD

The present disclosure relates generally to a system and method for digital communications, and, in particular embodiments, to a system and method for improving paging.

BACKGROUND

Future wireless communications systems are operating at ever higher carrier frequencies in a quest to find greater bandwidth and less interference. These wireless communications systems may operate at frequencies of 6 GHz and above. Such wireless communications systems are link-budget limited. Therefore, communications (transmissions and receptions) may need to be beamformed, even the control channels and synchronization signals, in order to meet performance requirements in an operating environment with high path-loss.

In the Fifth Generation (5G) New Radio (NR) architecture communicating devices face challenges arising from the narrow width beams used in beamformed communications. In particular, communicating devices in an inactive or idle state (mobility), or those participating in paging, area update (AU), discrete reception (DRX) ON operation, and so on, have significant difficulty in performing device or network discovery, e.g., downlink (DL) and uplink (UL) synchronization and beam alignment, etc., in reviving quickly data communications, and in setting up a connection if one is needed at all. Device or network discovery is more difficult in beamformed 5G NR systems (as compared to omni- or quasi-omni-directional Third Generation Partnership Project (3GPP) Long Term Evolution (LTE)) due to high paging overhead and time intensive synchronization upon user equipment (UE) wakeup (for paging, AU, or DRX ON) as beamformed links (BFLs) between UE and network entities may have become spatially misaligned during the inactive, idle, or DRX OFF period.

Therefore, there is a need for systems and methods for improving discovery, enabling quick wake-up or small data exchange, and signaling of status update and connection setup in communications systems using beamformed communications.

SUMMARY

Example embodiments provide a system and method for improving DL paging, AU, and DRX-ON in quick or light-weight discovery, signaling, or data communications.

In accordance with an example embodiment, a method for paging a first device by a second device is provided. The method includes sending, by the second device, a page message on a first path connecting the second device to the first device, and receiving, by the second device from the first device, a page response in response to the page message on a second path connecting the first device to the second device, wherein the first path and the second path are intentionally selected to be different in at least one of a number of hops in each path, radio access technology, cell or frequency carrier comprising each path, or width of beam pairs forming each path.

Optionally, in any of the preceding embodiments, an embodiment wherein the first path and the second path differ further in at least one of carrier frequency for cells anchored at the same access node, access node, radio access network, communications beam, spatial direction, communications system, number of wired or wireless connections in each path, or technology of connections in each path.

Optionally, in any of the preceding embodiments, an embodiment wherein the page response is received directly from the first device, or indirectly through a third device.

Optionally, in any of the preceding embodiments, an embodiment wherein the page message is sent in a scheduled time, frequency opportunity, a paging frame (PF) associated with the first device, a paging occasion (PO) associated with the first device, or the page message is sent in a discrete transmission on (DRX ON) interval of the first device.

Optionally, in any of the preceding embodiments, an embodiment wherein the page message or the page response comprises one of a resource configuration to assist the paging of the first device over a third path between the first device and a third device, or a connection setup of the third path between the first device and the third device, where the resource configuration may include system information between the first and the third device, e.g., for synchronization in any dimension (for example, time, frequency, code or RACH preamble, beam, or space), random access (dedicated RACH or common RACH), connection setup (identification, security information, dedicated bearer for data or control), page or page response messages or their contents, AU or location update messages, or scheduled paging opportunities (e.g., DRX pattern, PF, PO, time slots, implicit or explicit SSB indices). If main channel assistance is not utilized, the information may have to be broadcasted or beam-swept between the first device and the third device, or delivered over a dedicated (potentially costly or inefficient) communication path to use between the first device and the second device.

Optionally, in any of the preceding embodiments, an embodiment wherein the page message or the page response is communicated between the first device and the second device through the third device.

Optionally, in any of the preceding embodiments, an embodiment wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

Optionally, in any of the preceding embodiments, an embodiment wherein the page message or the page response further comprises information of a subset of the at least one communications beam measured or selected by the first and the second devices for the second path, or a subset of the at least one communications beam measured or selected by the first device and the third device for the third path between the first device and the third device.

In accordance with an example embodiment, a method for operating first device paged by a second device is provided.

The method includes receiving, by the first device from the second device, a page message on a first path connecting the second device to the first device, and sending, by the first device to the second device, a page response in response to the page message on a second path connecting the first device to the first device, wherein the first path and the second path are intentionally selected to be different in at least one of a number of hops in each path, radio access technology, cell or frequency carrier comprising each path, or width of beam pairs forming each path.

Optionally, in any of the preceding embodiments, an embodiment wherein the first path and the second path differ further in at least one of carrier frequency for cells anchored at the same access node, access node, radio access network, communications beam, spatial direction, communications system, number of wired or wireless connections in each path, or technology of connections in each path.

Optionally, in any of the preceding embodiments, an embodiment wherein the second path directly connects the first device to the second device, or the second path indirectly connects the first device to the second device through a third device.

Optionally, in any of the preceding embodiments, an embodiment wherein the page message or the page response comprises one of a resource configuration to assist a paging of the first device over a third path between the first device and a third device, or a connection setup of the third path between the first device and the third device.

Optionally, in any of the preceding embodiments, an embodiment wherein the page message or the page response are communicated between the first device and the second device by way of the third device.

Optionally, in any of the preceding embodiments, an embodiment wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

Optionally, in any of the preceding embodiments, an embodiment wherein the page message or the page response further comprises information of a subset of the at least one communications beam measured or selected by the first and the second devices for the second path, or a subset of the at least one communications beam measured or selected by the first device and the third device for the third path between the first device and the third device.

In accordance with an example embodiment, a method for paging a first device by a second device is provided. The method includes sending, by the second device to the first device, a page message on a first path connecting the second device to the first device, and receiving, by the second device from the first device, a page response on a second path connecting the first device to the second device, wherein one of the page message or the page response comprises configuration information for a third path between the first device and a third device or a connection setup of the third path between the first device and the third device.

Optionally, in any of the preceding embodiments, an embodiment wherein the first path replaces the third path for conveying a wireless page message from the third device to the first device, and wherein the second path replaces the third path for conveying a wireless paging response from the first device to the third device.

Optionally, in any of the preceding embodiments, an embodiment wherein the first path or the second path conveys configuration information assisting completion of the paging of the first device by the third device over the third path.

In accordance with an example embodiment, a method for paging a first device by a second device is provided. The method includes sending, by the second device to the first device, a first message comprising identification information of one or more communications beams used by the second device to receive messages, and receiving, by the second device from the first device, a second message comprising identification information of a subset of the one or more communications beams.

Optionally, in any of the preceding embodiments, an embodiment wherein sending the first message occurs after the first device and the second device are downlink synchronized.

Optionally, in any of the preceding embodiments, an embodiment wherein the method further includes receiving, by the second device, a third message comprising at least one of identifying information of the first device, identifying information of the second device, location information of the first device, location information of the second device, capability information of the first device, capability information of the second device, downlink page channel configuration, uplink page channel configuration, paging schedule in time, paging schedule in frequency, paging schedule in code, downlink synchronization information, uplink synchronization information, or spatial direction information.

Optionally, in any of the preceding embodiments, an embodiment wherein the first message is sent on a random access channel, on an allocated resource, or at a scheduled wake-up moment.

In accordance with an example embodiment, a second device adapted to page a first device. The second device includes one or more processors, and a computer readable storage medium storing programming for execution by the one or more processors. The programming including instructions to configure the second device to send a page message on a first path connecting the second device to the first device, and receive, from the first device, a page response in response to the page message on a second path connecting the first device to the second device, wherein the first path and the second path are intentionally selected to be different in at least one of a number of hops in each path, radio access technology, cell or frequency carrier comprising each path, or width of beam pairs forming each path.

Optionally, in any of the preceding embodiments, an embodiment wherein the first path and the second path differ further in at least one of carrier frequency for cells anchored at the same access node, access node, radio access network, communications beam, spatial direction, communications system, number of wired or wireless connections in each path, or technology of connections in each path.

Optionally, in any of the preceding embodiments, an embodiment wherein the page response is received directly from the first device, or indirectly through a third device.

Optionally, in any of the preceding embodiments, an embodiment wherein the page message or the page response comprises one of a resource configuration to assist the paging of the first device over a third path between the first device and a third device, or a connection setup of the third path between the first device and the third device.

Optionally, in any of the preceding embodiments, an embodiment wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

Optionally, in any of the preceding embodiments, an embodiment wherein the page message or the page response further comprises information of a subset of the at least one communications beam measured or selected by the first and the second devices for the second path, or a subset of the at least one communications beam measured or selected by the first device and the third device for the third path between the first device and the third device.

In accordance with an example embodiment, a first device is provided. The first device includes one or more processors, and a computer readable storage medium storing programming for execution by the one or more processors. The programming including instructions to configure the first device to receive, from a second device, a page message on a first path connecting the second device to the first device, and send, to the second device, a page response in response to the page message on a second path connecting the first device to the first device, wherein the first path and the second path are intentionally selected to be different in at least one of a number of hops in each path, radio access technology, cell or frequency carrier comprising each path, or width of beam pairs forming each path.

Optionally, in any of the preceding embodiments, an embodiment wherein the second path directly connects the first device to the second device, or the second path indirectly connects the first device to the second device through a third device.

Optionally, in any of the preceding embodiments, an embodiment wherein the page message or the page response comprises one of a resource configuration to assist a paging of the first device over a third path between the first device and a third device, or a connection setup of the third path between the first device and the third device.

Optionally, in any of the preceding embodiments, an embodiment wherein the page message or the page response comprises at least one of synchronization information of at least one communications beam used by the first and the second devices for the second path, scheduling information of the at least one communications beam used by the first and the second devices for the second path, or identification information of the at least one communications beam used by the first and the second devices for the second path, or at least one communications beam used by the first device and a third device for a third path between the first device and the third device.

Optionally, in any of the preceding embodiments, an embodiment wherein the page message or the page response further comprises information of a subset of the at least one communications beam measured or selected by the first and the second devices for the second path, or a subset of the at least one communications beam measured or selected by the first device and the third device for the third path between the first device and the third device.

In accordance with an example embodiment, a second device adapted to page a first device is provided. The second device includes one or more processors, and a computer readable storage medium storing programming for execution by the one or more processors. The programming including instructions to configure the first device to send, to the first device, a page message on a first path connecting the second device to the first device, and receive, from the first device, a page response on a second path connecting the first device to the second device, wherein one of the page message or the page response comprises configuration information for a third path between the first device and a third device or a connection setup of the third path between the first device and the third device.

Optionally, in any of the preceding embodiments, an embodiment wherein the first path replaces the third path for conveying a wireless page message from the third device to the first device, and wherein the second path replaces the third path for conveying a wireless paging response from the first device to the third device.

Optionally, in any of the preceding embodiments, an embodiment wherein the first path or the second path conveys configuration information assisting completion of the paging of the first device by the third device over the third path.

Taking DL paging as an example, practice of the foregoing embodiments enables increased paging efficiency through the use of assistance from a main device or pre-emptive paging by a paged device. Practice of the foregoing embodiments also enables increased signaling and small data communications efficiency of the DL paging originally by a channel (referred to herein as a secondary channel, such as 5G NR versions of 3GPP LTE paging channel (PCH), paging control channel (PCCH), physical downlink shared channel (PDSCH), and so on, from the paging base station), through assistance provided by a main channel, e.g., a main device (such as, a MgNB), a main carrier (for example, in carrier aggregation), a main signaling (including, a master radio resource control (RRC) connection) or data (such as, a low frequency (LF)) channel, a main beam (e.g., a wider-beamed or quasi-omni-directional beam), or a main cell (MCG), or preemptive paging by a paged device.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10A illustrates a flow diagram of example operations occurring in a network access node sending a page in a main channel to a UE with connections in both the main channel and a secondary channel, the page in the main channel replacing a page in the secondary channel according to example embodiments described herein;

FIG. 10B illustrates a flow diagram of example operations occurring in a UE receiving a page in a main channel, the page in the main channel replaces a page in the secondary channel according to example embodiments described herein;

FIG. 11A illustrates a flow diagram of example operations occurring in a network access node sending assistance in a main channel to assist a page in a secondary channel according to example embodiments described herein;

FIG. 11B illustrates a flow diagram of example operations occurring in a UE receiving assistance in a main channel to assist a page in a secondary channel according to example embodiments described herein;

FIG. 12A illustrates a flow diagram of example operations occurring in a network access node participating in a combination of main device based or triggered paging or assistance and secondary based paging according to example embodiments described herein;

FIG. 12B illustrates a flow diagram of example operations occurring in a UE participating in a combination of main device assisted paging according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
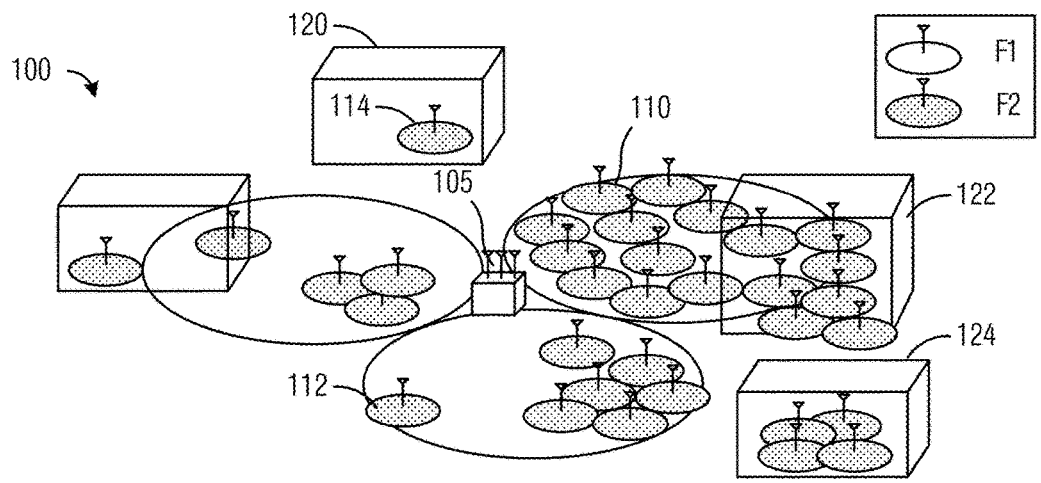
FIG. 1 illustrates an example communications system according to example embodiments described herein.

FIG. 1 shows an example communications system 100. Communications system 100 is an ultra-dense network (UDN). Communications system 100 provides deployment scenarios of hybrid macro-cells, small cells, and standalone or macro-assisted small cells. As shown in FIG. 1, communications system 100 includes a macro layer providing low frequency (LF) coverage at a first carrier frequency F1 and a small cell layer (or similarly, a virtual cell layer) with high frequency (HF), e.g., millimeter wave (mmWave), coverage at a second carrier frequency F2. The macro layer includes legacy transmit-receive points (TRPs), such as base station, access point, NodeB, evolved NodeB (eNB), gNodeBs (gNBs), master NodeB (MeNB) or master gNBs (MgNBs), secondary NodeB (SeNB) or secondary gNBs (SgNBs), and so on, (e.g., TRP 105) with large coverage areas and are usually part of a planned infrastructure, examples of which include the Third Generation Partnership Project (3GPP) Long Term Evolution (LTE) compliant cellular communications systems. The small cell layer includes small cell TRPs (SC-TRPs), e.g., SC-TRPs 110, 112, and 114, with small coverage areas and is generally part of an unplanned infrastructure. The SC-TRPs of the small cell layer may be used to provide coverage in areas with poor macro layer coverage or to enhance communications system performance, such as in high density areas (including regions 120, 122, and 124). Some of the SC-TRPs shown in FIG. 1 are deployed in the coverage area of a legacy TRP (such as SC-TRPs 110 and 112), while other SC-TRPs are standalone SC-TRPs and are deployed where there is no legacy layer coverage (such as SC-TRP 114). It is noted that a TRP of the macro layer (e.g., a gNB) may be logically partitioned into a centralized unit (CU) and one or multiple distributed units (DUs), where in different embodiments, each DU may connect to one or multiple SC-TRPs or remote radio heads (RRHs), or each DU may be a SC-TRP or RRH itself, etc. Collectively, the legacy TRPs and the small cell TRPs may be referred to as network access nodes.

Although communications system 100 is shown in FIG. 1 as including both a macro layer and a small cell layer, the example embodiments discussed herein are also operable in a communications system that includes only one layer, e.g., a small cell layer. Alternatively, in a communications system with both a macro layer and a small cell layer, the macro layer may or may not provide assistance to the small cell layer, at least in terms of user equipment (UE) for AU, being paged, DRX OFF-to-ON switching, and beam alignment.

While it is understood that communications systems may employ multiple TRPs capable of communicating with a number of UEs, only one macro TRP and a plurality of SC-TRPs are illustrated for simplicity.

Figure 2B:
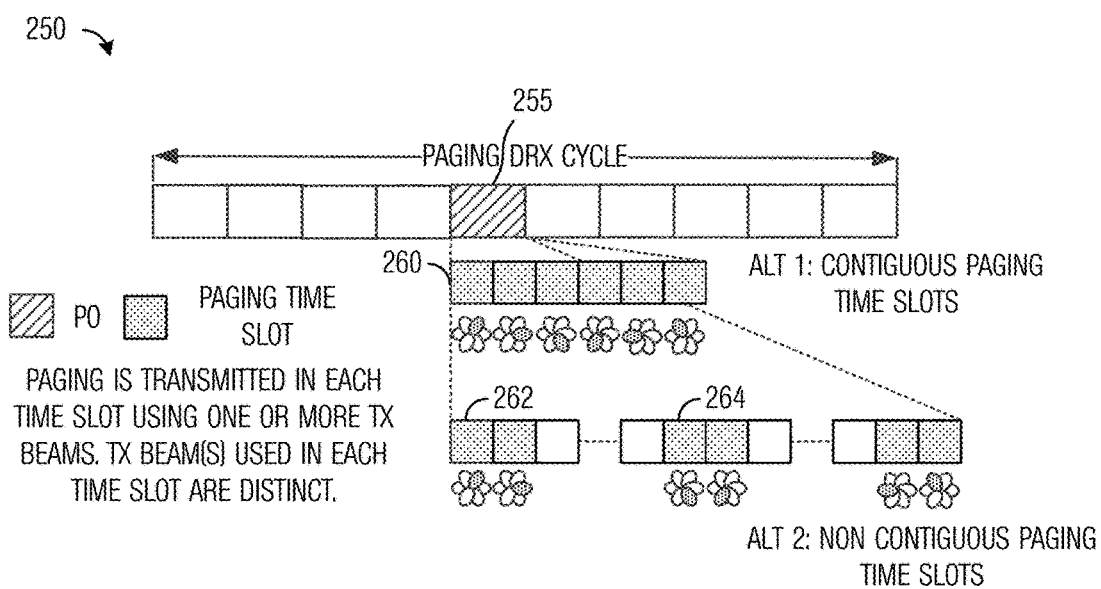
FIG. 2B illustrates an example paging DRX cycle with beam sweeping illustrated in the paging occasion, e.g., a paging occasion (in a paging sub-frame, for example) consisting of multiple paging time slots for sweeping through possible spatial directions.
Figure 2A:
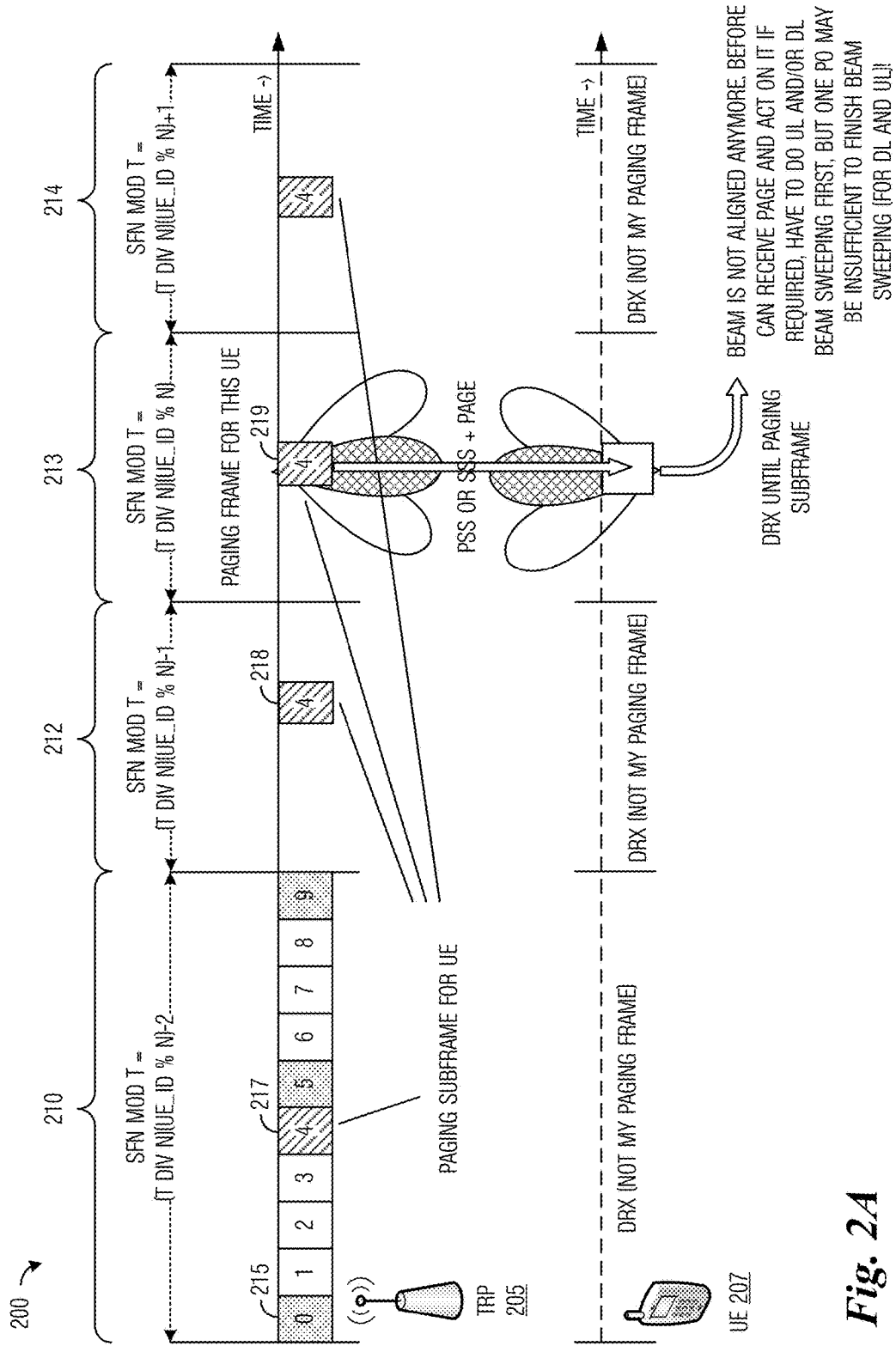
FIG. 2A illustrates a diagram of a downlink beamformed paging process in a standalone cellular communications system.

FIG. 2A illustrates a diagram 200 of a downlink beamformed paging process in a standalone cellular communications system. Diagram 200 illustrates interaction between a TRP 205 and a UE 207 in a downlink paging process. A plurality of radio frames, such as frames 210, 212, 213, and 214, is shown in diagram 200. Each radio frame includes a plurality of subframes. The subframes in the plurality of subframes may be assigned for different tasks. As an example, subframe 215 may be used for control information, while subframe 217 may be used for paging purposes. Some subframes may be used for multiple tasks. As an illustrative example, subframe 217 may be used for transmitting synchronization signals (SS) in SS blocks, as well as for paging purposes. For discussion purposes, subframe 217 and other subframes assigned for paging purposes (e.g., subframes 218 and 219) are referred to as paging subframes, which corresponds to the similarly defined paging occasion (PO) in a paging frame (PF) in 3GPP LTE. It is noted that radio frames 212, 213, and 214 also include other subframes, but only the paging subframes are shown to simplify the figure. Different subframes of different radio frames may be intended for paging and SS transmission for different UEs or groups of UEs. As an example, subframe 219 of radio frame 213 is intended for UE 207, while subframe 218 of radio frame 212 is intended for a different UE or a different group of UEs.

For discussion purposes, differences between paging and handover are presented. Normally, paging is used by a communications system to locate and wake up a UE that is in idle or inactive (e.g., RRC_IDLE or RRC_INACTIVE) state when DL data intended for the UE arrives, even if UE is moving, i.e., the UE is in the idle state mobility or inactive state mobility. Paging takes place when one or multiple TRPs (or CUs, DUs, or base stations) within a tracking area (TA) broadcasts a page message, which is generated from a core network (CN) (for an idle UE) or from a radio access network RAN (for an inactive UE). The paging occurs at pre-scheduled moments (e.g., PF, PO, or paging slots), so that UE can respond to the page in order to resume (for an inactive state UE) or set up (for an idle state UE) a radio resource control (RRC) connection and a radio bearer that were previously suspended (for an inactive state UE) or released (for an idle state UE).

It is noted that the paging process is different from an RRC_CONNECTED mode mobility or handover (HO) process, wherein the UE remains in an RRC_CONNECTED state with a source TRP until after it receives the HO command, upon which the UE attempts random access with a target TRP and RRC Connection Re-establishment. Hence, the messages, UE states, network-side UE context, and processes are subtly different between paging and connected mode HO. It is further noted that paging may occur for UEs in an RRC_CONNECTED state, i.e., an active state, but only limited to specific scenarios such as system information change or emergency services such as earthquake and tsunami warning service (ETWS) and commercial mobile alert service (CMAS), which is not a focus of the example embodiments presented herein.

The page from a first TRP in a TA, if heard by an idle or inactive UE, where hearing a page must be preceded by the UE becoming DL synchronized with the first TRP and receiving and decoding system information from the first TRP, will trigger the UE to initiate a series of actions, including (but not limited to) UL synchronization, or random access and possibly RRC connection setup as needed with the first TRP or a second TRP that is in the same TA. These actions may be in response to the natural mobility or signal changes of the UE, e.g., the UE moved to the second TRP because it heard the page from the first TRP. In other words, the actions involving the second TRP, which is different from the first TRP but still within the same TA, is due solely to the mobility of the UE and not due to purposeful selection of the second TRP.

Comparatively, the example embodiments presented herein allow the UE to respond to a page by performing actions with the first TRP or with the second TRP by intentionally using a different path than a reverse of the original path that carried the page independently of whether or not the UE moves. It is noted that the reserve (UL vs. DL) path of the original path could be on the same central frequency (for TDD) or same evolved universal terrestrial radio access (E-UTRA) absolute radio frequency channel number (EARFN) (for FDD). Comparatively a different path that is not a reverse of the original path, but refers to a variety of possible selections including but not limited to different bandwidth parts on the same carrier, different carriers or cells with the same TRP (where the two paths are coupled by carrier aggregation-like mechanism), or a channel of the same central frequency but with a different TRP (where the two TRP's or two paths are coupled by DC-like aggregation mechanism. The responding to the page in the different paths may be in order to achieve benefits, such as, a LF DL path with wider coverage that does not mandate that the paging utilize beam sweeping, and a HF UL path can be used for LF assisted paging; just for page response in order to synchronize between the second TRP and the UE; or just for setting up a high-rate beamformed (UL or DL) data connection with the second TRP. Similarly, a HF path for pages and a LF path for page responses may also be adopted to compensate each other to balance complexity, efficiency, and UE-side power consumption. During the page response process with the second TRP, the example embodiments presented herein do not mandate the RRC connection status between UE and the first TRP, nor do they mandate that the two paths are the same or offer simple reverse paths (i.e., UL vs. DL as in TDD or FDD) of each other. The freedom to adopt different paths for paging and paging response may be more effective than mandating beam-sweeping HF DL paging and HF UL paging response through the same path (e.g., requiring the matching of UL and DL EARFCN central frequencies as in FDD, same TA, but possibly with same or different TRPs, cells, different carriers, technologies, or radio access systems, rather than just reversed UL or DL directions on the same central frequency or on standard-defined EARFCN-like UL-DL central frequencies).

In 5G NR, directional or narrow width downlink beam sweeping is often used in at least one of PO, slot, AU, or DRX ON periods. In NR, particularly in a situation with a HF or beamformed carrier over which the connection and channel are to be set up or resumed, the TRPs will have to beam sweep across different directions in order to send a page message to the UE that is at an unknown direction or location, and UE will have to monitor the swept beams from unknown directions or TRPs in its neighborhood upon scheduled moments (e.g., when the UE's DRX ON period overlaps with the PF, PO, or slots). The need for beam sweeping adds a great deal of complexity to the existing paging mechanisms as in presented in 3GPP LTE. As shown in radio frame 213, paging subframe 219 includes multiple directional beam-specific SS blocks supporting beamformed SS sweeping, or multiple paging slots supporting directional beam swept paging (i.e., multiple pages in a single PF or PO assuming one page per slot) intended for UE 207. However, it may take an extended amount of time for UE 207 and TRP 205 to become uplink or downlink beam re-aligned. The amount of time for UE 207 and TRP 205 to become reliably uplink or downlink beam re-aligned may be greater than the time available in a scheduled UE wakeup period (e.g., a PF or PO slot, AU interval, paging interval, or a DRX ON period) which is generally configured to be very short in order to reduce UE power consumption. In order to facilitate uplink or downlink beam re-aligned, the same paging information may be repetitively transmitted on multiple downlink transmission beams (assuming one directional beam per slot, but other configurations are possible) to the same UE, which is potentially a waste of resources.

FIG. 2B illustrates an example paging DRX cycle 250 with beam sweeping illustrated in a PO. Paging DRX cycle 250 includes at least one PO (paging subframe 255). Each paging subframe potentially has to accommodate multiple paging slots or SS blocks per paging opportunity to support beam sweeping or bi-directional spatial synchronization. A PO may include a plurality of paging time slots, such as paging time slots 260, 262, and 264. Within a single paging time slot, a paging device (e.g., a TRP in downlink paging) may transmit pages in accordance with a transmit beam configuration. The transmit beam configuration may change for different paging time slots, in order to provide adequate coverage, for example. The beam configurations may repeat if there is a sufficient number of paging time slots. The paging time slots may be contiguous or non-contiguous in nature, as shown.

Figure 3:
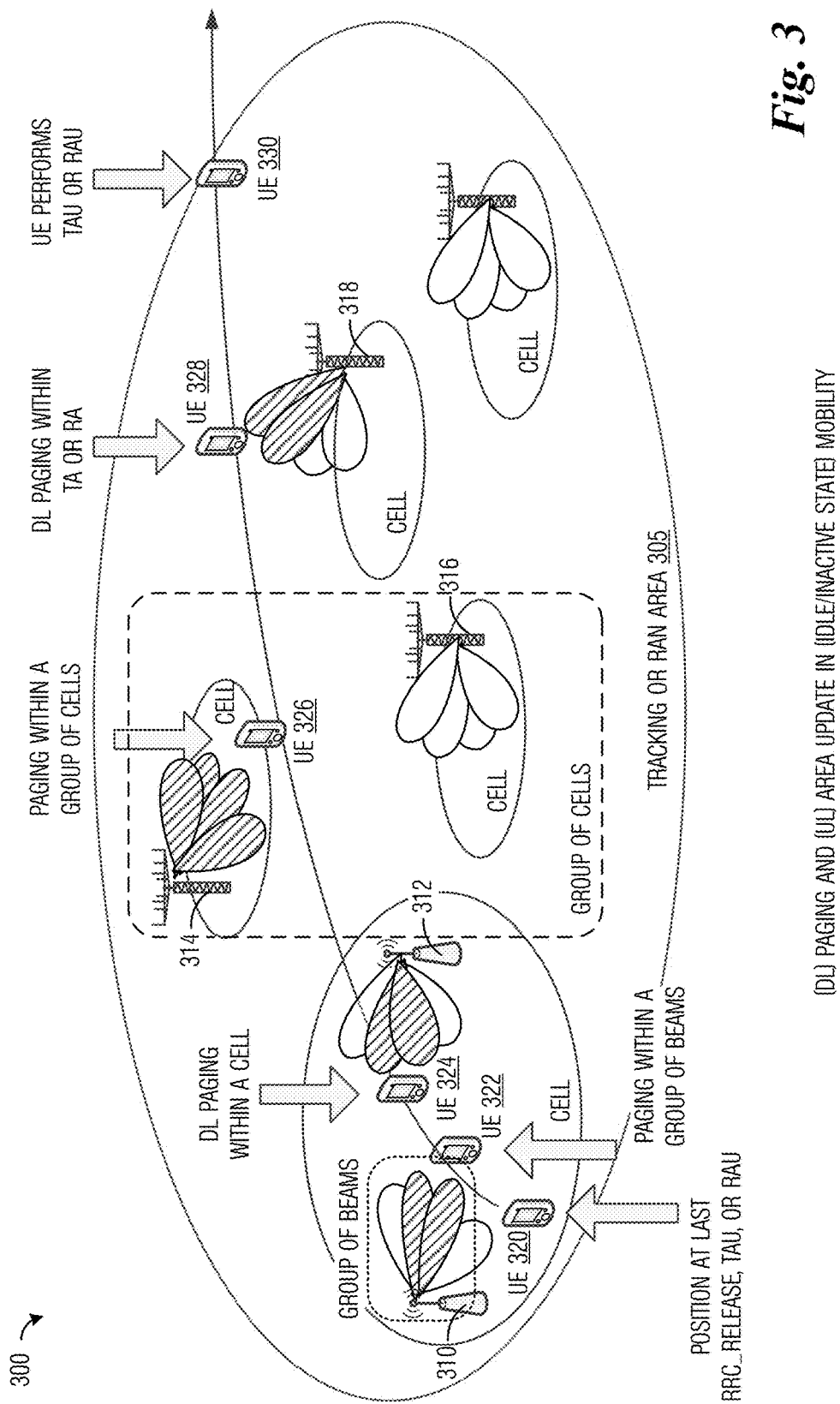
FIG. 3 illustrates a communications system highlighting downlink paging and uplink AU in idle or inactive state mobility.

FIG. 3 illustrates a communications system 300 highlighting downlink paging and uplink AU in idle or inactive state mobility. Communications system 300 includes a tracking area (TA) or radio access network (RAN) area (RA) 305. Within tracking or RAN coverage area 305 are a plurality of TRPs, such as TRP 310, 312, 314, 316, and 318. Communications system 300 also includes a UE 320 that is moving through the TA or RA 305. Initially, UE 320 is located within a cell served by TRPs 310 and 312.

As UE 320 moves, it enters a coverage area of TRP 310, where it is now shown as UE 322 to prevent confusion. UE 322 may be paged by downlink pages transmitted by TRP 310 using a group of beams of TRP 310. As UE 322 continues to move, it enters a coverage area of TRP 312, where it is now shown as UE 324 to prevent confusion. UE 324 may be paged by downlink pages transmitted by TRP 312 using a group of beams of TRP 312.

As UE 324 continues to move, it exits the coverage area of the cell served by TRPs 310 and 312 and enters a coverage area comprising a group of cells, where it is shown as UE 326 to prevent confusion. UE 326 may be paged (or group paged) within the group of cells by one or more cells that are closest to or with highest quality channel with UE 326, for example, including cells of TRPs 314 and 316. As UE 326 continues to move further, it exits the coverage area of the group of cells, where it is shown as UE 328 to prevent confusion. UE 328 may be paged in a cell of TRP, e.g., TRP 318, which is within TA or RA 305. As UE 328 further moves, it exits TA or RA 305 (where it is shown as UE 330 to prevent confusion). As UE 330 exits TA or RA 305, UE 330 performs a tracking area update (TAU) or a RAN area update (RAU).

Existing 3GPP RAN1 or RAN2 agreements (3GPP TR38.802 and 3GPP TR38.804) include the following:

A UE in RRC_IDLE or RRC_INACTIVE state monitors paging or notification every discrete transmission (DRX) cycle;

Paging may be transmitted at least using downlink beam sweeping (the paging may include information about paging or the paging message);

For paging in multibeam operation, beam sweeping is performed in paging occasions (POs), which correspond to DRX ON of (multiple) UEs being paged, and each of which consists of multiple contiguous-or-not paging time slots, Each paging slot may correspond to one or more subframes or OFDM symbols, and each paging slot may consist of a set of one or more directional beams (such as synchronization signal (SS) blocks) with paging information in each beam, and Different slots carry different sets of downlink transmit beams to sweep, but repetition of the same transmit beam set in different slots may occur to help a UE to synchronize with the downlink transmit beams.

5G NR paging may be achieved using techniques including:

A predictive solution that is similar to early wake up from sleep, where a UE can wake up early before pre-determined or negotiated time instances (e.g., a PF, a PO, a boundary crossing for AU, a DRX ON, and so on) to predictively synchronize with the network (e.g., using a closest early SS block burst set) or spatially align to the best beams (e.g., in a specific SS block or slot), so that upon the pre-determined or negotiated time instances the UE and the network can quickly communicate based on the spatially aligned best beams or synchronization information without having to perform full alignment. A potential problem with this approach is that an early wakeup of UE doesn't mean that there will be early transmission of SS signals from the network-side, while wakeup too early (e.g., at a previously transmitted SS period) implies that the beams will become misaligned at the right paging or SS period.

A downlink narrow beam sweeping solution using downlink beams transmitted by the network with downlink paging information and downlink signals. Discussions remain regarding PF or PO structure (e.g., slots, patterns of slots, etc., for beam sweeping) or usage of reference signals or synchronization signals for paging, as well as paging channel structure. Reference signals or synchronization signals may be used for downlink paging by scheduling or blind detection. This is an approach considered for a beamformed 5G NR downlink paging systems.

A Layer 1 repetition solution that works for both narrow or wide beam sweeping, and omni-directional or wide beam transmission with repetition and combining at a cell edge is also usable, with significant repetition.

A Layer 1 multipoint coordination solution, where multiple TRPs transmit pages to the UE with coordination information and UE-side combination.

A group based paging and paging response driven solution that is beam sweeping based with a default configuration that is multi-casted to a group of UEs to allow the UEs to derive PFs or POs, while UEs in the group may respond (by random access, for example) if it is really a target to be paged, or otherwise remain silent (as the paging is a false alarm).

With respect to paging in 3GPP LTE for a baseline example, where each quasi-omni-directional page in a PF or PO would be sent or repeated in multiple directions (i.e., slots or beams) of the PO in case of 5G NR, the network configures a paging cycle, which specifies at least the radio frames and subframes that are used for paging. The configuration (similar to the DRX and TAU cycles) is sent as cell default information in a broadcasted system information block 2 (SIB2) or in the case of TAU, negotiated by UE-dedicated mobility management entity (MME) non access stratum (NAS) signaling between the CN and the UE. A paging cycle may include paging listening intervals (of the PFs or POs), as well as any unavailable intervals.

UEs that are in RRC idle (RRC_IDLE) mode during the DRX ON interval of the UEs monitor a physical downlink control channel (PDCCH) for a paging radio network temporary identifier (P-RNTI). UEs in RRC_CONNECTED mode may be paged only for ETWS and CMAS, i.e., UEs that are RRC_CONNECTED (C-DRX ON) may optionally receive paging. It is noted that for a specific UE, not every PF or PO is intended for the particular UE.

Uplink TAU is sent by the UE can occur even in the RRC_CONNECTED mode (but cannot occur while the UE is in RRC_IDLE). Uplink TAUs may occur periodically, or when the UE crosses a TA boundary and has determined that it has moved to a different cell (by primary synchronization signal (PSS) or secondary synchronization signal (SSS) scanning, for example). It is noted that a TAU may span the coverage of a plurality of TRPs, such as on the order of 10's of TRPs, for example.

If paging cycles are configured for both default and UE-dedicated situations, a UE may utilize a lowest cycle value.

Paging to a UE in DRX mode arrives only during the DRX ON period, with a paging cycle equal to DRX cycle*n, where n is greater than or equal to one.

1-bit paging information may be sent in the PDCCH upon a PF or PO for a group of possible UEs that hashes to the same PF or PO for DRX ON and page monitoring. However, not every UE in the group of possible UEs is actually paged (i.e., the page in the PF or PO may be a false alarm to some UEs). Alternatively, 4-bit paging information may be sent in the physical downlink shared channel (PDSCH) upon a PF or PO specifies actual UEs being paged.

The TRP and UE determines a PF or PO number according to the page and wake up information, respectively, and transmits or receives the messages in the PDCCH or PDSCH based upon the PF or PO number.

In 3GPP LTE, paging messages are delivered using the PDCCH and PDSCH, like any other form of downlink data. The paging messages transmitted on the PDSCH are allocated transmission resources. A scheduling assignment conveyed on the PDCCH that is addressed to the P-RNTI (which is shared by all UEs) provides information about the paging messages. The delivery channel is cell specific because both the assisting reference signal (the cell specific reference signal (CRS)) and the scrambling code are derived from the physical cell identity (PCI).

As an example, the PF or PO is determined by evaluating the following expressions:

$PF = SFN \bmod T = (T \operatorname{div} N)*(UE\_ID \bmod N)$, or $PO = i\_s = \operatorname{floor}(UE\_ID/N) \bmod Ns$, where
  $i\_s$ is an index pointing to PO from a subframe pattern with parameter Ns (which is defined for FDD and TDD as a function of 3GPP TS36.304 and T is the DRX cycle of the UEs),
  nB is one of the set {4T, 2T, T, T/2, T/4, T/8, T/16, and T/32},
  $N = \min(T, nB)$,
  $Ns = \max(1, nB/T)$,
  UE_ID is derived from IMSI (USIM) or 0 (if no ISM for emergency call) UE_ID=IMSI mod 1024,
  IMSI is a sequence of 10 digits of type integer (0 . . . 9),
  UE_ID is 10 bits long (there are 1024 groups of mobile terminals).

With respect to the 3GPP LTE paging, AU, or DRX procedure, during the DRX wakeup (DRX ON) period that overlaps with the PO, the UE may take the following actions, including:
  Cell search (PSS or SSS) detection that is sent by the network right before the downlink paging message transmission in the same PO. If the paging of the UE occurs at all, it will take place in the UE's DRX ON interval.
  Downlink (CRS) measurement.
  If the PO is for the UE by the network and the paging message is indeed sent in the UE's DRX ON interval, the UE performs physical broadcast channel (PBCH) or master information block (MIB), and PDCCH or system information block (SIB) decoding.
  If the PSS or SSS measurement meets the cell search criteria (during consecutive PSS or SSS measurements by the UE in between two POs, for example), the UE performs a cell search instead.

It is noted that in 5G NR, the actions presented above or similar behaviors (e.g., with NR-PSS replacing PSS, etc.) would be repeated at the slot or SS block level (in the case that a PO consists of multiple slots or SS blocks, each of which corresponds to a different beam direction). Therefore, there is significant complexity in simply adopting the 3GPP LTE paging, AU, or DRX procedure as is in 5G NR.

According to 3GPP TR 38.802, in a multi-beam deployment, beam sweeping is supported for paging. With respect to paging channel design in the RRC idle mode, a paging message is scheduled using downlink control information (DCI) carried in a NR-PDCCH and is transmitted in the associated NR-PDSCH. The search space of the paging channel may be explicitly configured using system information (SI) with minimum or broadcasted other information. Alternatively, the search space of the paging channel may be implicitly configured with the reference signal and the scrambling code for the paging channel being derived from the PCI (in a manner similar to 3GPP LTE with the CRS and PBCH).

According to the 3GPP RAN1 #87 meeting, in a multi-beam deployment, beam sweeping is supported for paging. Items for future study include: details of paging for multiplexing paging with SS blocks; and an additional round of beam sweeping for paging (the additional round of beam sweeping is different from the beam sweeping of the SS burst set). It is noted that other alternatives are not precluded.

According to the 3GPP RAN1 #88 meeting, agreements were made concerning paging and carrier bandwidth for high frequency (HF). Support for the paging channel design for at least the RRC idle mode includes the paging message being scheduled by DCI and is carried in the NR-PDCCH and is transmitted in the associated NR-PDSCH. Information about paging that triggers UE beam reporting (if supported) is an item for future study. It is noted that the information about paging is in the DCI and that the information about paging is in a non-scheduled physical channel.

It is noted that the usage of the DMRS and NR-SSS or NR-PSS is due to a lack of consistently available CRS. Beam sweeping and broadcasted paging occurs at the slot level, where each slot may be a symbol or a subframe, with each PF or PO possibly having multiple slots. Configurable transmission resources are used due to the lack of consistently present NR-PDCCH and NR-PDSCH for RRC_IDLE and RRC_INACTIVE states.

According to 3GPP TR 38.804 and 3GPP RAN2 agreements of January 2017, a UE in the INACTIVE state is reachable via a RAN-initiated notification or paging and CN-initiated paging. RAN and CN paging occasions overlap and the same paging or notification mechanism are used. A RAN node may configure a UE in the INACTIVE state with a RAN configured paging DRX cycle (may be a UE specific configuration). Additional agreements include:

- A UE in RRC_IDLE or RRC_INACTIVE state monitors paging or notification every DRX cycle.
- A UE monitors one PO per DRX cycle. A PO is the time interval over which a paging message is transmitted by a gNB.
- The length of the DRX cycle is configurable. A default DRX cycle length is provided in system information. Furthermore, a UE specific DRX cycle length may also be provided to the UE using dedicated signaling.
- The number of POs in the DRX cycle is configurable and is provided in system information.
- If multiple POs are configured in the DRX cycle, the UEs may be distributed to the POs based on UE ID.
- The RAN2 understanding is that paging may be transmitted at least during beam sweeping, with the content of the paging being information about the paging or a paging message (which are for further study).
- A PO may consist of multiple time slots (e.g., a subframe or an orthogonal frequency division multiplexed (OFDM) symbol). Multiple time slots enable the transmission of paging using a different set of downlink transmit beams in each time slot or may be used to enable repetition.
- The number of time slots in a PO is provided in the system information.

According to the 3GPP RAN2 #98 meeting, agreements about RAN-initiated paging include:

- Use the same PO calculation mechanism for UEs in inactive state as for UEs in idle state.
- The same input derived from a CN UE ID and the same calculation equation is used to calculate the PO for RAN-initiated paging and CN-initiated paging.
- The gNB needs to know the input derived from the CN UE ID to be used in the calculation and the CN UE specific DRX cycle from the NG core.
- A UE in inactive state may be configured with a UE specific RAN DRX cycle over dedicated signaling.
- The UE uses the shortest of: the CN UE specific DRX cycle, the cell broadcasted DRX cycle, or the RAN DRX cycle. All of the DRX cycle values are multiples of each other.
- The UE specific RAN DRX cycle is released when the UE enters the idle state.
- The UE specific RAN DRX cycle is kept when the UE moves to one new cell in the RAN area in an inactive state.

According to an example embodiment, a main communications channel assists a secondary channel for paging, AU, or DRX ON operations in the exemplary scenarios such as Dual Connectivity (DC), Multi-Connectivity (MC), or Carrier aggregation (CA) based systems. Main and secondary channel deployments include: NR LF (being the main channel) and NR HF (being the secondary channel); 3GPP LTE LF and NR HF; LF MeNB or MgNB, and LF SeGB or SgNB; TRP and LF SeNB; or SgNB and TRP; carrier 1 and carrier 2 of an anchoring base station or of two different base stations, NR DL or UL and LTE UL or DL; or vice versa; and so on. The main channel may be over LF, wide beam carrier, macro-cell, or with main gNB or eNB, while the secondary channel is in idle or inactive state, and the secondary channel operates over HF, narrow beam carrier, small cell, secondary gNB or eNB, or with TRP. The main channel may be used to wake up a UE in the secondary channel.

Although the discussion focuses on channels, the example embodiments are operable over paths (or equivalently, end-to-end or multi-hop communications paths) which may also include serially connected wireline connections, as well as one or multiple serially connected wireless channels, where each connection is considered a "hop" between two TRPs (or CU, DU, or base stations) or a TRP and the UE. As an example, a first part of a path comprises one or more channels (e.g., wireless LF or HF) and a second part of the path comprises one or more wireline connections. Furthermore, a path may include more than one parts. Therefore, the discussion of channels should not be construed as limiting to either the scope or the spirit of the example embodiments described herein.

Figure 5:
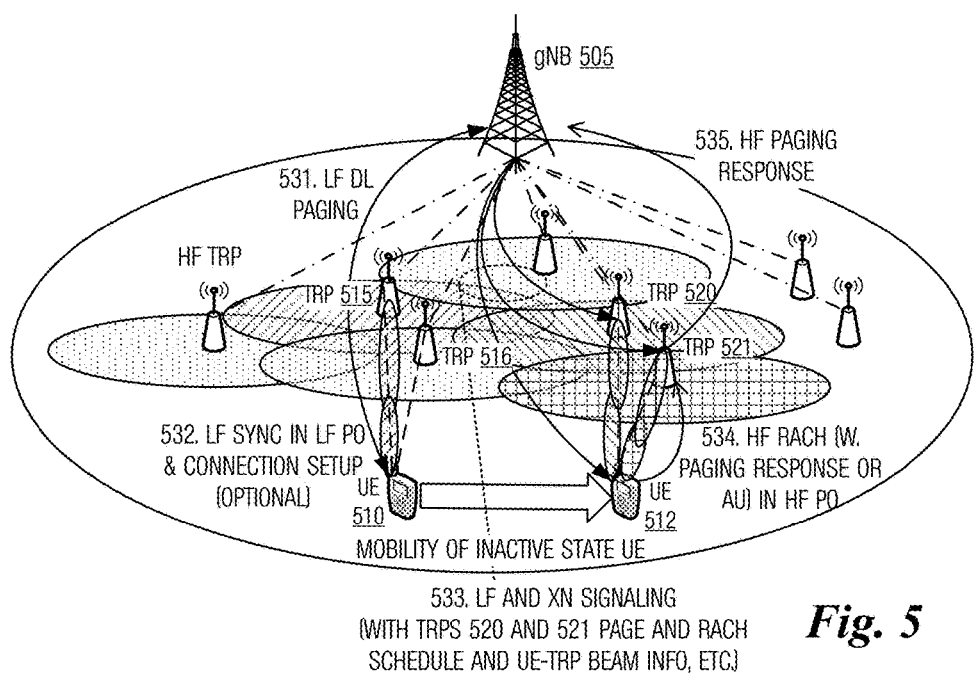
FIG. 5 illustrates a communications system highlighting main channel assisted downlink paging or connection setup in a secondary channel according to example embodiments described herein.

According to a first example embodiment, the main channel is used to locate and page the UE in a secondary channel to prepare the UE for its services in secondary channel, for example. In other words, the main channel replaces (in part or in total) the process of paging in the secondary channel. The example embodiment is operable for a UE in the same RRC state for both the main and secondary channels, or for a UE that is in a RRC_IDLE state for a first channel (either main or secondary channel) and in a RRC_INACTIVE state for a second channel (either secondary or main channel). This example embodiment is shown in FIG. 5.

According to a second example embodiment, the main channel is used to assist (but not replace) the paging in the secondary channel. In other words, the main channel is used to perform signaling to provide information about a paging configuration, scheduling, content, and so on, for the secondary channel. As an example, paging configuration information (such as paging cycles carried in minimum or additional system information or UE specific RRC dedicated configuration, and so on), scheduling information (such as time of PF, time of PO, time of SS bursts, time of blocks, time of DRX ON, predicted beam directions, resources of RACH, resources of AU, resources of page response, and so forth), content information (such as paging ID, cause code such as downlink data availability for services in secondary channel, etc.), and so on, is signaled in the main channel for paging that will take place in the secondary channel. The example embodiment is operable for a UE in different RRC states for main and secondary channels, e.g., RRC_CONNECTED for the main channel but RRC_IDLE or RRC_INACTIVE for the secondary channel.

According to a third example embodiment, a combination of the first example embodiment and the second example embodiment is used of a hybrid approach for main channel assisted or replaced secondary paging, where the replacement or assistance depends on configuration or usage scenario, for example. As an example, a main channel is first used to page the UE (if the UE is in idle or inactive state), then possibly change the UE to the RRC_CONNECTED state in the main channel in order to use the main channel signaling (as discussed in the second example embodiment) to further assist paging or state transitions of the UE in the idle or inactive state in the secondary channel. The third example embodiment may adapt to different scenarios of the same or different initial RRC states of the UE in the main channel vs the secondary channel. It is noted that in another example embodiment, the state transition in the main channel may not be needed because the signaling in the main channel (for assisting the secondary channel) may be carried out in the main channel system information or a paging message. The third example embodiment may be used in a hierarchical paging solution with different granularities. As an example, a LF or wide-beam paging solution with time, frequency, or code synchronization in the main channel with coarse beam directions (e.g., for UE-TRP over secondary channel), then a HF or narrow-beam paging solution with time, frequency, or code synchronization in the secondary channel with fine spatial alignment. This example embodiment is shown in FIG. 5.

Figure 4:
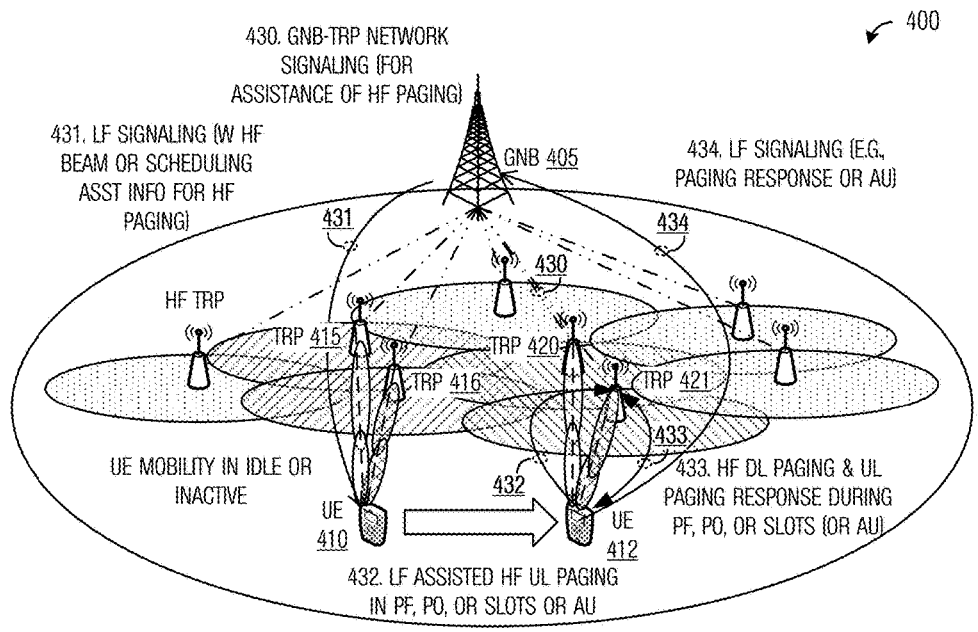
FIG. 4 illustrates a communications system highlighting hybrid uplink and downlink paging with main channel assistance to paging in a secondary channel according to example embodiments described herein.

FIG. 4 illustrates a communications system 400 highlighting hybrid uplink and downlink paging with main channel assistance to paging in a secondary channel. For discussion purposes, it is assumed that the main channel is LF and the secondary channel is HF, and that the main channel is in the active state, but the secondary channel is in the idle or inactive state. Communications system 400 includes a main channel served by a gNB 405 and a secondary channel served by TRPs, such as TRPs 415, 416, 420, and 421. Communications system 400 also includes a UE 410 that is served by gNB 405, as well as TRPs 415 and 416, at least initially. UE 410 is mobile, and due to its mobility, moves out of coverage of TRPs 415 and 416 into coverage of TRPs 420 and 421. When UE 410 is in coverage of TRPs 420 and 421, UE 410 is referred to as UE 412 to avoid confusion.

gNB 405 and the TRPs exchange network signaling to enable gNB 405 to provide assistance for paging in the second channel (shown as dashed-dot-dot lines, event 430). While UE 410 is in coverage of TRPs 415 and 416, gNB 405 signals to UE 410 information for paging in the second channel (event 431). As UE 410 moves and enters the coverage of TRPs 420 and 421, UE 412 (former UE 410) initiates uplink paging in a PF, PO, or slot using the paging information provided by gNB 405 over the main channel or an AU (event 432). TRPs 420 and 421 perform downlink paging in the second channel and UE 412 sends an uplink paging response during the PF, PO, or slot or AU is performed (event 433). UE 412 and gNB 405 exchange signaling (for a paging response or AU) in the main channel (event 434).

FIG. 5 illustrates a communications system 500 highlighting main channel assisted downlink paging in a secondary channel. The aspects shown in FIG. 5 may be considered as an example illustration of the third example embodiment with hybrid approach in secondary channel paging assistance, or connection setup (i.e., paging replacement). It is noted that a connection setup process may range from the initial DL or UL synchronization and system information acquisition to random access (e.g., RACH) steps for establishing a connection, and then RRC signaling (such as Connection Request, Setup, Reconfiguration, and Complete messages, for example), which are normally more comprehensive than the paging process. However, as an embodiment and due to assistance from the main channel the connection setup process may be limited to minimum synchronization (e.g., in the DL) and long-term dedicated data bearer or data connection setup in the secondary channel because the secondary system information (frequency, beam, etc.) and secondary system's synchronization and data connection requirements between the UE and the TRP can be already communicated over the main channel (such as the main control channel in Dual Connectivity) in the form of main channel assistance or during the main channel paging. In comparison, without assistance from the main channel, paging a UE in the RRC_Idle state or the newly introduced NR RRC_Inactive state would have to adopt a costly process involving synchronization to a beam-sweeping TRP following a pre-scheduled time-spatial pattern (SS blocks (SSBs), paging opportunities, or slots, for example) to DL measurement (of a SSB, for example), PDCCH decoding (of P-RNTI for being paged or not) and PDSCH included page message decoding, and then system information acquisition and a random access (e.g., RACH) process with the secondary systems for establishing a connection before a RRC connection can be set up or resumed using RRC signaling. For discussion purposes, it is assumed that the main channel is LF and the second channel is HF, and the main channel assists in downlink paging in the secondary channel for future data communications over the secondary channel. Communications system 500 includes a main channel served by a gNB 505 and a second channel served by TRPs, such as TRPs 515, 516, 520, and 521. Communications system 500 also includes a UE 510 that is served by gNB 505 and initially by TRPs 515 and 516. After UE 510 moves around, it becomes served by TRPs 520 and 521, where UE 510 is now referred to as UE 512 to avoid confusion.

gNB 505 may initially determine if UE 510 is in the RRC_CONNECTED state in the main channel. If there are no active connections between gNB 505 and UE 510 in the main channel (e.g., by LF or omni-directional, wide-beam cell, carrier, frequency, and so on), gNB 505 determines if paging would be more conveniently performed in the main channel. If paging would be more convenient if performed in the main channel, gNB 505 and UE 510 exchange signaling to perform downlink paging in the main channel (events 531 and 532).

gNB 505 may use any active main channel connection (if any exists) to determine if expected data communications may be more beneficially performed on the main channels (e.g., with lighter weight, richer resources, higher cost efficiency resources, and so on). If the data communications may be performed more beneficially on the main channels, the secondary channel may be ignored altogether.

If the data communications may not be performed more beneficially on the main channels, gNB 505 uses main channel signaling to assist secondary channel (e.g., the TRPs) downlink paging and HF synchronization (or HF connection setup over the secondary channel) between the TRPs and UE 512 (event 533). The main channel signaling may provide information about: paging IDs for TRP, UE, and beam; resources or spatial direction (in the time, frequency, or code domains); minimum system information in HF PBCH, PDCCH, as well as additional system information or page in PDSCH. The main channel signaling may use any specialized physical (PHY) or media access control (MAC) layer signals or RRC signaling to help UE 512 with paging, state transition, or RRC connection setup over the secondary channel. The paging response or AU is sent to gNB 505 either directly (over main channel) or indirectly by TRP relay (over secondary channel) (events 534 and 535)

If paging would not be more convenient if performed in the main channel, gNB 505 may directly proceed to events 533, 534, and 535 or use some other paging approach.

In different embodiments, assistance on the main channel may be performed by a gNB (or CU) to TRPs (or DUs) in the secondary channel or with the same TRP, gNB, or CU but over different channels (e.g., carriers, cells, etc.). It is noted that in the case of DC, MC, or CA based systems, the main device may refer to RRC anchoring MgNB or PCell, while the secondary device may refer to a SgNB or SCell. The main device may assist in secondary channel synchronization by signaling to both the UE (using the LF) and the TRPs (over an Xn or X2 interface, for example) information regarding their close proximity radio wise, resources, directions for beam alignment, uplink RACH, as well as any relevant information inside the page of the main channel or RRC signaling.

If needed, the main and secondary channels may adopt cross channel paging operating, such as, paging occurs in the main channel but page response or RACH occurs in the secondary channel, or vice versa. If there is mobile originated (MO) data that requires the secondary channel, the main channel may be used for control and the secondary channel in the uplink direction may be used for data communications. If there is mobile terminated (MT) data that requires the secondary channel, the main channel may be used for control and the secondary channel in the downlink direction may be used for data communications. If there is either MO or MT data along with secondary data, the secondary channel may be configured in both downlink and uplink directions.

According to an example embodiment, a UE transmits an uplink wake-up signal (referred to herein as an uplink page) before or during scheduled wake-up moments to access opportunistically, randomly, or by scheduling a dedicated uplink paging channel. The UE may transmit the uplink page before downlink synchronization, not just in response to downlink paging. Uplink paging, similar to uplink beacons for RRC_CONNECTED mode mobility, may be used for RRC_INACTIVE or RRC_IDLE state operations (such as for paging, AU, or DRX ON, rather than just mobility). The content of the uplink page may differ from the content of the uplink beacon. The use of uplink paging, followed by downlink paging (the paging response, for example), enables the TRP and the UE (one or both of which may be beamformed) to discover, locate, and directionally align with one another, potentially saving the dedicated AU or RACH process in paging, AU, or DRX-ON.

Figure 6:
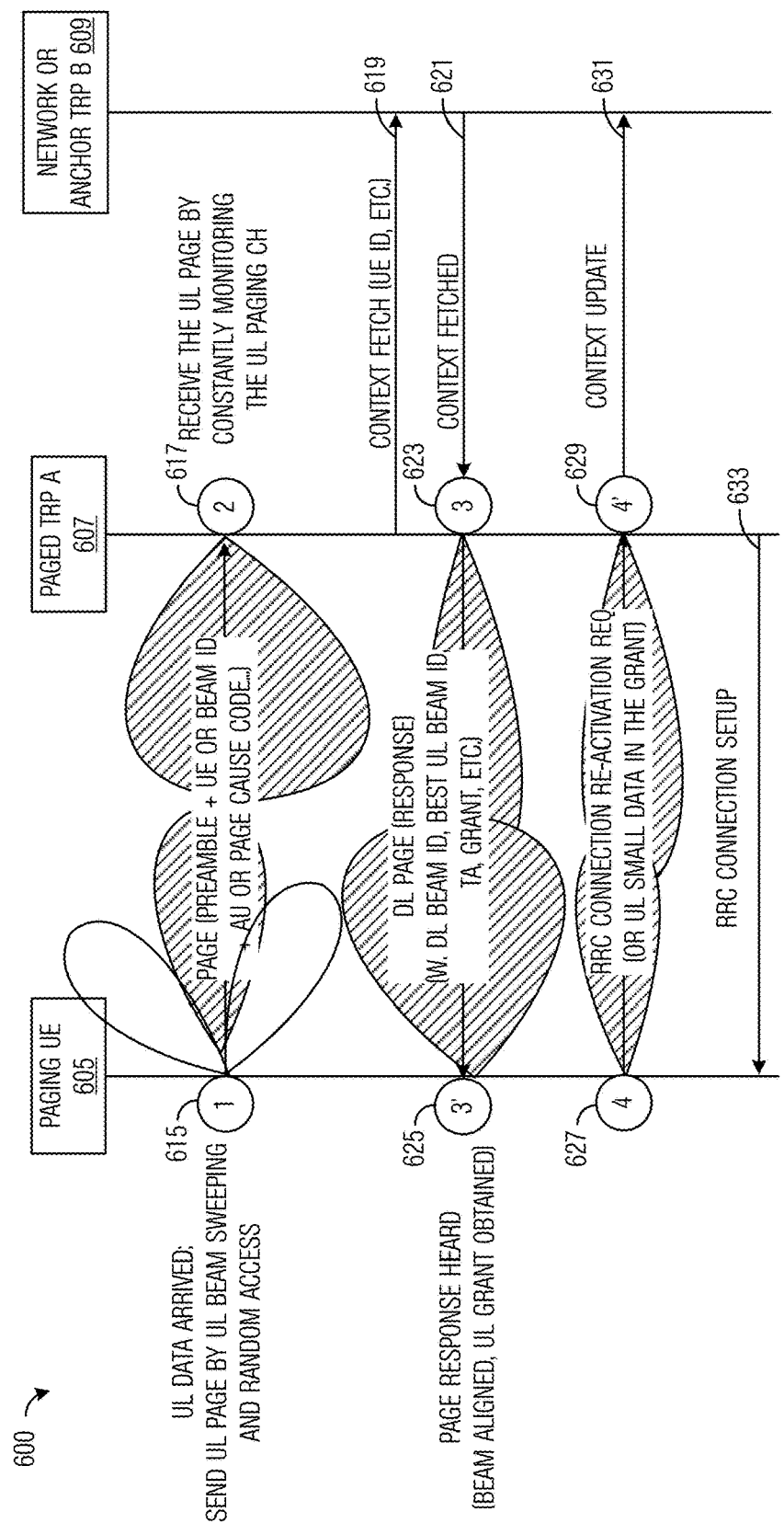
FIG. 6 illustrates a diagram of operations and communications performed by communicating devices participating in uplink paging without main device assistance according to example embodiments described herein.

FIG. 6 illustrates a diagram 600 of operations and communications performed by communicating devices participating in uplink paging without main device assistance. Diagram 600 presents operations and communications performed by a paging UE 605, a paged TRP 607, and an anchor TRP 609. It is noted that anchor TRP 609 may be replaced by another network entity, such as a gNB, eNB, MgNB, MeNB, communications controller, and so on. For discussion purposes, assume that paging UE 605 has roamed into the coverage area of paged TRP 607 after it has entered the inactive state with anchor TRP 609.

Paging UE 605, with uplink data to transmit, sends an uplink page (event 615). The uplink page may be sent using beam sweeping. If the uplink data is small MO data or has high priority, then the uplink page may be sent using a random access technique on a dedicated uplink paging channel, instead of waiting for POs or slots where paging UE 605 would listen for beam swept downlink pages from nearby TRPs. The uplink page may include a preamble (such as a random access preamble), as well as a UE ID or beam ID, AU code or page cause code, and so on. Paged TRP 607 receives the uplink page from paging UE 605 (event 617). Because the dedicated uplink paging channel supports random access, paged TRP 607 continually monitors the dedicated uplink paging channel and is able to receive the uplink page from paging UE 605.

Paged TRP 607 fetches the context of paging UE 605 from anchor TRP 609 (event 619). Paged TRP 607 may send a context fetch including the UE ID to anchor TRP 609, for example. Paged TRP 607 receives the UE context of paging UE 605 from anchor TRP 609 (event 621). Paged TRP 607 sends a page response to paging UE 605 (event 623). The page response may be sent in resources allocated for a downlink page associated with paging UE 605. In other words, the page response is sent where the downlink page intended for paging UE 605 would have ordinarily been sent. The page response may include a beam ID of the downlink beam used by paged TRP 607 to receive a transmission from paging UE 605, a beam ID of a best uplink beam of paging UE 605, TA information, a resource grant, and so on.

Paging UE 605 receives the page response (event 625). Paging UE 605 becomes beam aligned with paged TRP 607 and has one or more resources to transmit the uplink data. Paging UE 605 and paged TRP 607 may exchange messaging to synchronize based on the UE context and states and establish a RRC connection (events 627, 629, 631, and 633) or paging UE 605 and paged TRP 607 may exchange messaging to synchronize based on the UE context and states and paging UE 605 sends the uplink data (events 627, 629, and 631).

The contents of the various messages sent by paging UE 605, paged TRP 607, and anchor TRP 609, as well as the ordering of the various messages, may be changed (e.g., swapped, removed, reordered, enhanced, and so on) in different embodiments without changing the example embodiments presented herein. As an illustrative example, instead of blindly sweeping the uplink page in the dedicated uplink paging channel, paging UE 605 may schedule the uplink page in time, frequency, code, or beam direction.

Figure 7:
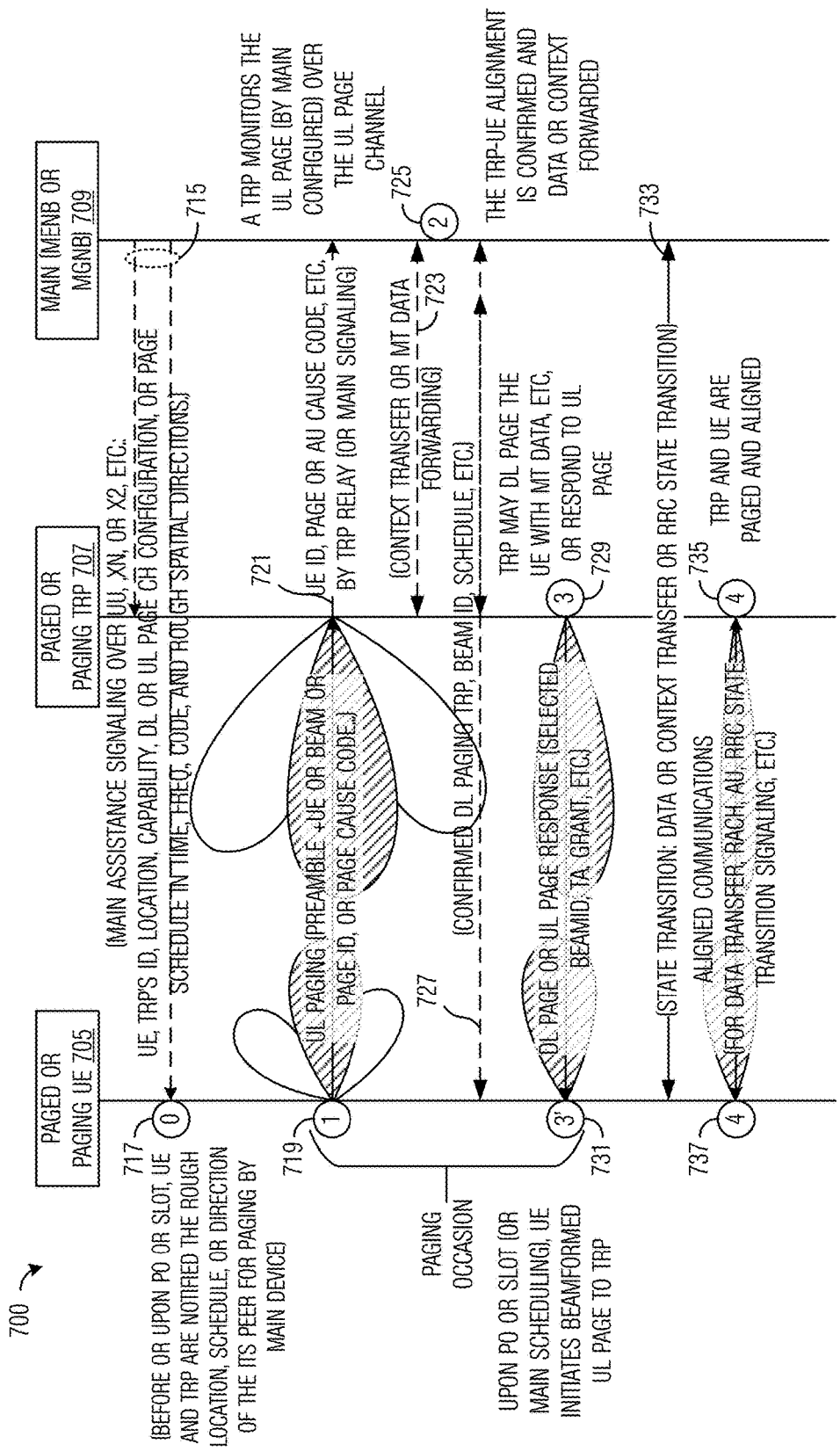
FIG. 7 illustrates a diagram of operations and communications performed by communicating devices participating in uplink paging with or without main device assistance according to example embodiments described herein.

FIG. 7 illustrates a diagram 700 of operations and communications performed by communicating devices participating in uplink paging with or without main device assistance. It is noted that the operations and communications shown in FIG. 7 is under an assumption that UE is on LF RRC_ACTIVE state with the main device, and on HF RRC_IDLE state with a TRP. Diagram 700 presents operations and communications performed by a paged or paging UE 705, a paged or paging TRP 707, and main device 709. It is noted that main device 709 may be a MgNB or a MeNB, for example. For discussion purposes, assume that uplink paging (and associated downlink page response) are used to facilitate the delivery of downlink data, e.g., MT data, to paged or paging UE 705 and that paging or paged UE 705 is in the RRC_IDLE state with paged or paging TRP 707 but in the RRC_CONNECTED state with main device 709. Main device 709 may assist paged or paging UE 705 and paged or paging TRP 707 in determining each other's existence, as well as sharing paging beam information, paging resources, PO or slot information before the uplink page is transmitted.

Main device 709 sends main assistance signaling to (in the UL) paged or (in the DL) paging TRP 707 and (in the DL) paged or (in the UL) paging UE 705 (event 715). The main assistance signaling may be sent over Uu, Xn, or X2 interfaces, for example. The main assistance signaling may include UE ID, TRP ID, UE or TRP location information (that can be obtained by database or by a positioning system (such as the Global Positioning System (GPS)), etc.), UE or TRP capability information, downlink page configuration, uplink page configuration, page schedule in time, frequency, or code and rough spatial directions (that can be obtained by GPS or geometric methods, for example, before discovery and beam alignment is started), and so on. Paged or paging UE 705 receives the main assistance signaling before or upon PO or slot (event 717).

Upon a PO or slot (or based on main device scheduling) paged or paging UE 705 initiates a beamformed uplink page (event 719). The uplink page may include a preamble (such as a random access preamble), as well as a UE ID or beam ID, AU code or page cause code, and so on. Paged or paging TRP 707, monitoring an uplink paging channel receives the uplink page (event 719). Paged or paging TRP 707 sends information about paged or paging UE 705 and the uplink page to main device 709 (event 721). The information sent by paged or paging TRP 707 may include UE ID, page or AU cause code, and so on. The information may be sent using a TRP relay connection or by main signaling. Main device 709 and paged or paging TRP 707 exchange messaging to perform a context transfer or downlink data forwarding (event 723). Main device 709 also confirms (or be confirmed by TRP-UE) regarding TRP-UE alignment or context forwarding (event 725).

Main device 709, paged or paging TRP 707, and paged or paging UE 705 exchange messaging to confirm downlink paging TRP, beam ID, schedule, and so on (event 727). Paged or paging TRP 707 sends a downlink page including the downlink data to paged or paging UE 705 or respond to the uplink page with a page response (event 729) and paged or paging UE 705 receives the downlink page with the downlink data or the page response (event 731). It is noted that events 719-731 span a PO. Main device 709, paged or paging TRP 707, and paged or paging UE 705 exchange messaging to facilitate a state transition (event 733), if needed at all. The state transition may include a data transmit, a context transfer, or an RRC state transition. Paged or paging TRP 707 and paged or paging UE 705 are paged and aligned. Paged or paging TRP 707 and paged or paging UE 705 perform communications using aligned beams (events 735 and 737). The communications may include the transfer of the downlink data, a random access procedure, AU, RRC state transition signaling, and so on.

The contents of the various messages sent by paged or paging UE 705, paged or paging TRP 707, and main device 709, as well as the ordering of the various messages, may be changed (e.g., swapped, removed, reordered, enhanced, configured, and so on) in different embodiments without changing the example embodiments presented herein. Additionally, the downlink page of event 729 may be considered as a page response to the uplink page.

According to an example embodiment, a technique using hybrid uplink or downlink paging with or without main device assistance is provided. In an embodiment, the uplink page is sent ahead of scheduled downlink synchronization and downlink page, but it is possible to shuffle the ordering in different embodiments. The downlink page may be considered to be a response to the uplink page, and vice versa. If main device assistance is used, the assistance may help the UE and TRP to determine each other's POs in time slot or block, frequency, code, or space, which is useful in selecting beams (transmit and receive) used in paging, random access, page response, and so on. The PO discussed herein is similar to a PF or PO in 3GPP LTE, but the PO also operates similarly for other levels of beam sweeping (e.g., using multiple slots in each PO or using SS blocks, with one slot or one block per beam). In other embodiments, network configuration may be used to enable other paging and assistance combinations, including: uplink paging and main device assistance, downlink paging and main device assistance, uplink and downlink paging, uplink and downlink paging with main device assistance in paging, AU, or DRX OFF-ON transition.

Figure 8:
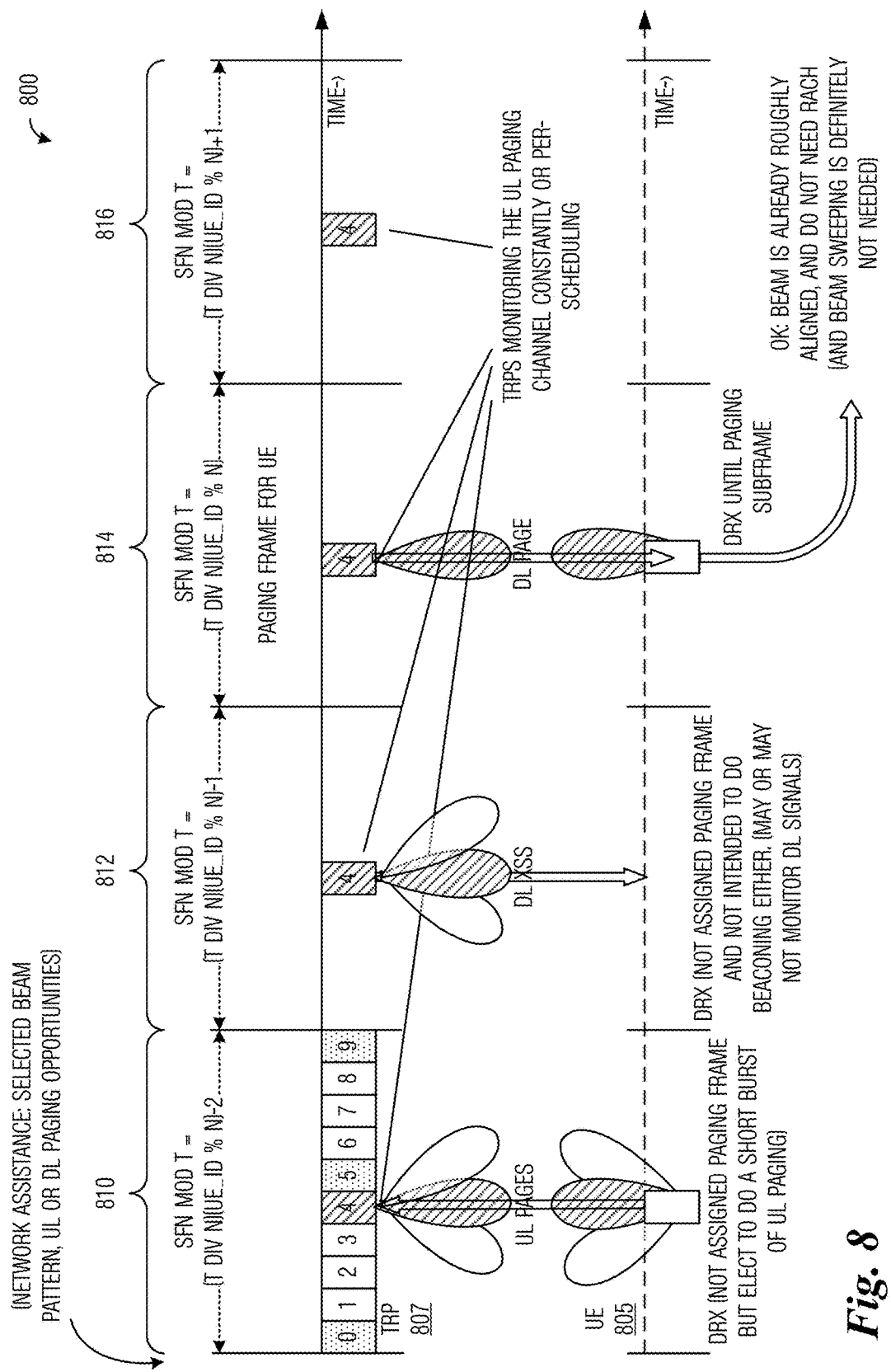
FIG. 8 illustrates a diagram of a hybrid paging process with main device assistance to downlink paging in the secondary channel according to example embodiments described herein.

FIG. 8 illustrates a diagram 800 of a hybrid paging process with main device assistance to downlink paging from a beamformed paging TRP 807 to a paged UE 805, where UE 805 in DRX will wake up as scheduled (the system frame number (SFN) based paging and wake-up occasions are only for illustration purpose, as in 3GPP LTE) in the secondary channel. Diagram 800 illustrates interaction between paged UE 805 and paging TRP 807. A plurality of radio frames, such as frames 810, 812, 814, and 816, is shown in diagram 800. A main device provides main device assistance to UE 805 and TRP 807. Main device assistance may include information regarding POs in time, frequency, code, or space, which is useful in selecting beams (transmit and receive) used in paging, random access, page response, and so on. At a time before a PF or PO for UE 805, e.g., radio frame 810, UE 805 sends beamformed uplink pages to TRP 807, which is monitoring uplink paging channels and is able to receive the uplink page. In radio frame 812, TRP 807 sends beamformed PSS or SSS, but because UE 805 is in DRX and is not assigned a paging subframe in radio frame 812, UE 805 may or may not be monitoring downlink signals. However, in radio frame 814, UE 805 is assigned a paging subframe, and is able to receive a beamformed downlink page from TRP 807 in the paging subframe. Both UE 805 and TRP 807 are beam aligned using the main device assistance previously received. After receiving the beamformed downlink page, UE 805 and TRP 807 are roughly aligned and UE 805 does not need to perform a random access procedure. Furthermore, beam sweeping is no longer needed due to the two devices being roughly aligned. However, beam refinement may help to improve performance.

Figure 9:
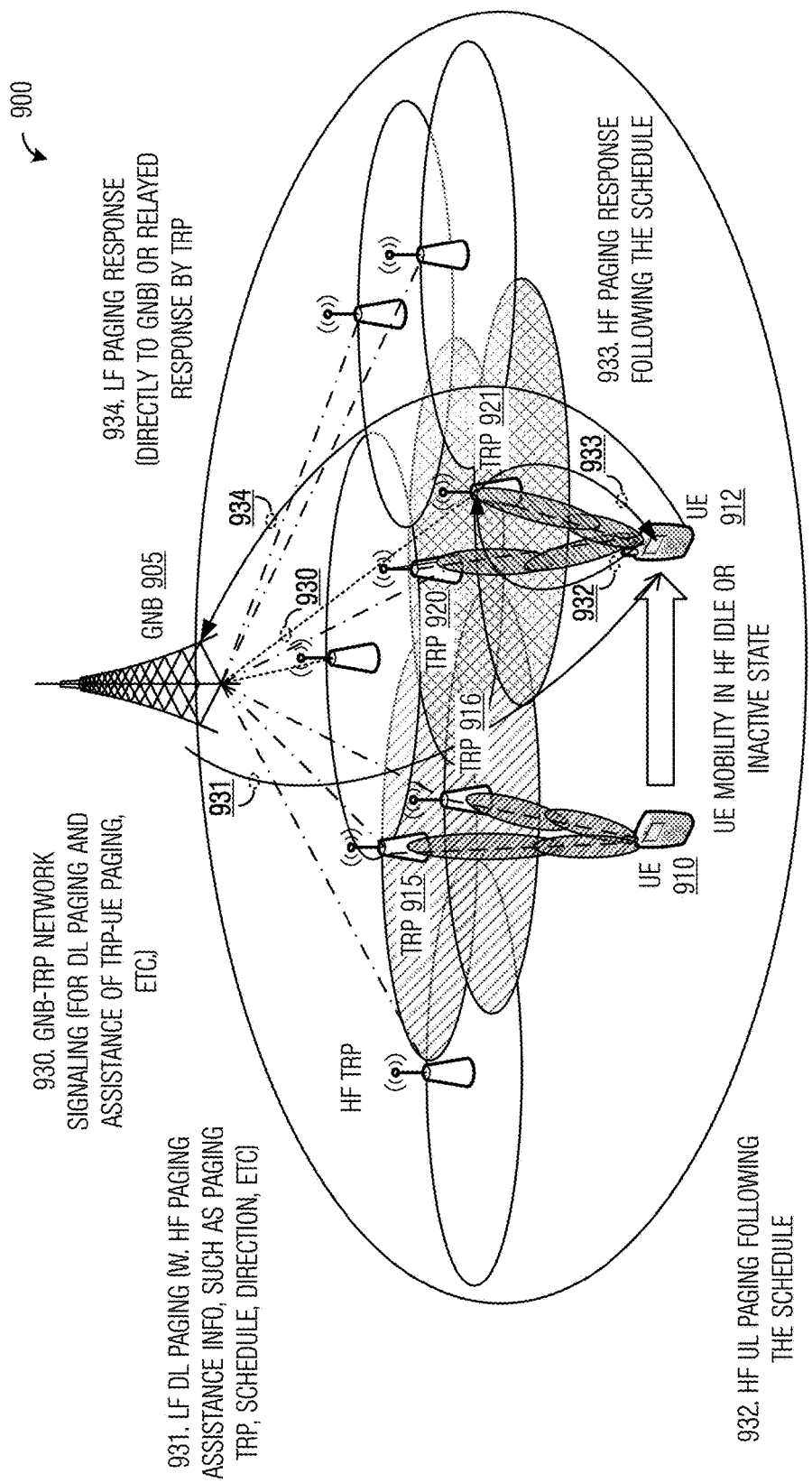
FIG. 9 illustrates a communications system highlighting hybrid uplink or downlink paging according to example embodiments described herein.

FIG. 9 illustrates a communications system 900 highlighting an example embodiment of hybrid uplink or downlink paging. For discussion purposes, it is assumed that communications system 900 supports both main downlink paging by a gNB 905 in PF, PO, or slots, and uplink paging by UE 910 after UE 910 enters idle or active state. In addition to gNB 905 that is serving a main channel, communications system 900 also includes a secondary channel served by TRPs, such as TRPs 915, 916, 920, and 921. Furthermore, UE 910 is mobile, and due to its mobility, moves out of coverage of TRPs 915 and 916 into coverage of TRPs 920 and 921 (where it is shown as UE 912 to prevent confusion).

gNB 905 and the TRPs exchange network signaling to enable gNB 905 to provide assistance for downlink paging in communications system 900 (as an example, gNB 905 and TRP 921 exchange network signaling (event 930)). The network signaling between gNB 905 and the TRPs also provide assistance for TRP to UE paging, as well as other assistance or information. gNB 905 performs downlink paging on the main channel to UE 912 (event 931). The downlink paging may include HF paging assistance information, such as paging TRP information (e.g., ID, scrambling code, and so on), paging schedule, beam ID or direction, and so forth. UE 912 sends uplink paging on the secondary channel to one or both of TRPs 920 and 921 (even 932). The uplink paging sent by UE 912 may be in accordance with a paging schedule, such as received in the downlink page from gNB 905 in event 931. UE 912 receives a paging response on the secondary channel (event 933). The paging response may be in accordance with the paging schedule. UE 912 sends an uplink paging response to gNB 905 (event 934). The uplink paging response may be sent directly to gNB 905 or it may be relayed indirectly through a TRP.

The contents of the various messages sent by gNB 905, TRPs 915, 916, 920, and 921, and UE 910-912, as well as the ordering of the various messages, may be changed (e.g., swapped, removed, reordered, enhanced, configured, and so on) in different embodiments without changing the example embodiments presented herein. As an illustrative example, in an embodiment, the hybrid technique may involve a combination of downlink paging and uplink paging both on the secondary channel between a UE and one or more TRPs utilizing main device assistance, and downlink paging on the main channel (between a gNB and a UE) and downlink paging on a secondary channel (between TRPs and the UE).

FIG. 10A illustrates a flow diagram of example operations 1000 occurring in a network access node sending a page in a main channel to a UE with connections in both the main channel and a secondary channel, the page in the main channel replacing a page in the secondary channel.

Operations 1000 begin with the network access node (e.g., a main base station) sending a page to the UE on the main channel (block 1005). Although the page is sent on the main channel, the page is intended to prepare the UE for services on the secondary channel. The network access node receives a page response from the UE (block 1007). The page response may be received on the main channel, or may be relayed back to the network access node by a secondary network node (e.g., a TRP).

FIG. 10B illustrates a flow diagram of example operations 1050 occurring in a UE receiving a page in a main channel, the page in the main channel replaces a page in the secondary channel. The UE has connections in both the main channel and a secondary channel.

Operations 1050 begin with the UE receiving a page from a network access node on the main channel (block 1055). Although the page is sent on the main channel, the page is intended to prepare the UE for services on the secondary channel. The UE sends a page response to the network access node (block 1057). The page response may be sent on the main channel, or may be on the secondary channel to a secondary network device (e.g., a TRP) and then relayed back to the network access node by the secondary network device.

FIG. 11A illustrates a flow diagram of example operations 1100 occurring in a network access node sending assistance in a main channel to assist a page in a secondary channel.

Operations 1100 begin with the network access node sending a message in a main channel with assistance to a UE (block 1105). The assistance may be in the form of paging information, paging schedule, or content regarding a page on a secondary channel.

FIG. 11B illustrates a flow diagram of example operations 1150 occurring in a UE receiving assistance in a main channel to assist a page in a secondary channel.

Operations 1150 begin with the UE receiving a message from a network access node in a main channel, the message including assistance from the access node (block 1155). The assistance may be in the form of paging information, paging schedule, or content regarding a page on a secondary channel. The UE receives a page message (block 1157), which may include a cause for the paging (e.g., DL data for the paged UE has arrived, SI change, or ETWS or CMAS emergency notification), UE identification (e.g., system architecture evolution (SAE) temporary mobile subscriber identity (s-TMSI) in 3GPP LTE). In an embodiment, the page message may include the system information about secondary channel, paging information, resource configuration, or other device information involved in the second channel setup. A page response may refer to a random access (e.g., RACH) process to establish or resume an RRC connection. In an embodiment, a page response may also include at least an acknowledgement or response to the secondary channel setup or a response to the page over the main channel. The page message may be received from a TRP on the secondary channel. The UE sends a page response (block 1159). The page response may be sent directly to the network access node in the main channel or the page response may be sent indirectly to a TRP, which relays the page response to the network access node.

FIG. 12A illustrates a flow diagram of example operations 1200 occurring in a network access node participating in a combination of main device based or triggered paging and secondary based paging.

Operations 1200 begin with the network access node sending a page to the UE in the main channel (block 1205). Although the page is sent in the main channel, the page is intended to prepare the UE for services on the secondary channel. The network access node receives a page response from the UE (block 1207). The network access node sends a message in the main channel with assistance to a UE (block 1209). The assistance may be in the form of paging information, paging schedule, or content regarding a page on a secondary channel. The network access node receives a page response (block 1211). The page response may be received in the main channel or relayed from a TRP.

FIG. 12B illustrates a flow diagram of example operations 1250 occurring in a UE participating in a combination of main device assisted paging.

Operations 1250 begin with the UE receiving a page from a network access node in the main channel (block 1255). Although the page is sent in the main channel, the page is intended to prepare the UE for services on the secondary channel. The UE sends a page response to the access node (block 1257). The UE transitions to a new secondary channel state (block 1259). The UE may transition from the idle or inactive state to the connected state, for example. The UE receives a message from the network access node in a main channel, the message including assistance from the network access node (block 1259). The assistance may be in the form of paging information, paging schedule, or content regarding a page on a secondary channel. The UE sends a page response (block 1261). The page response may be sent directly to the network access node in the main channel or the page response may be sent indirectly to a TRP, which relays the page response to the network access node.

Figures 13A, 13B:
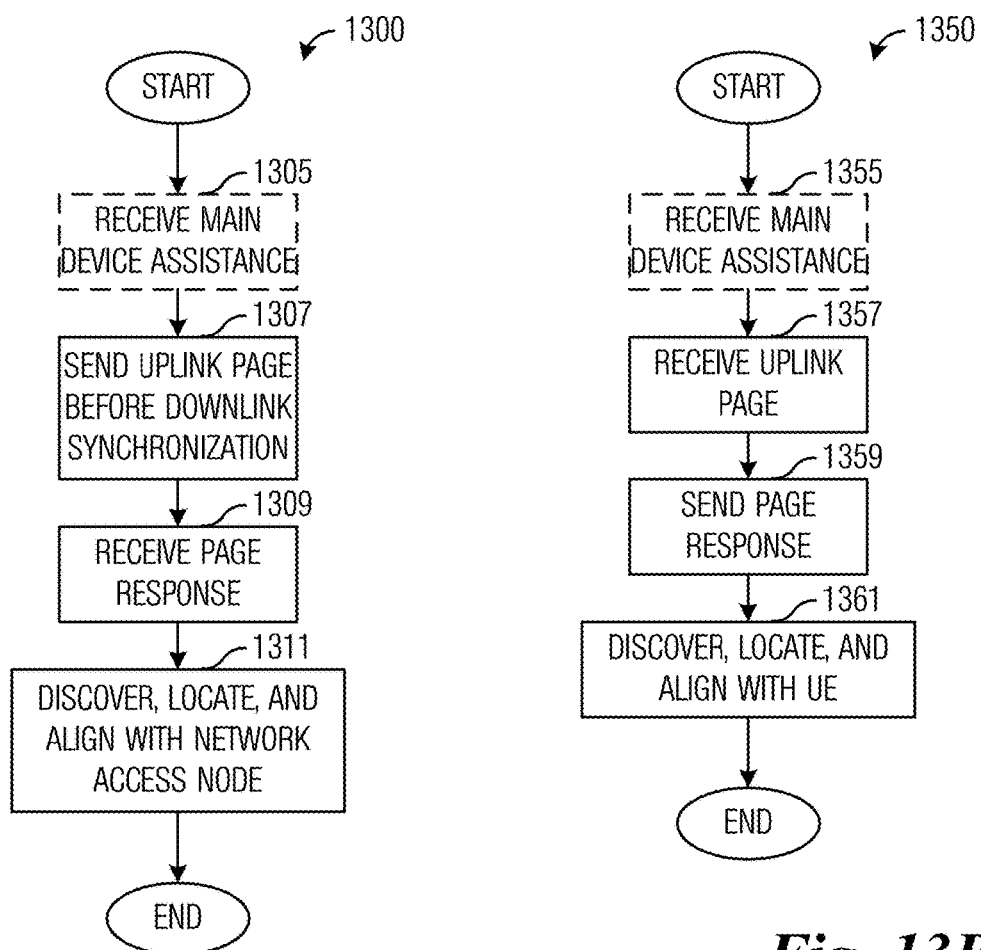
FIG. 13A illustrates a flow diagram of example operations occurring in a UE participating in uplink page initiated paging according to example embodiments described herein.
FIG. 13B illustrates a flow diagram of example operations occurring in a network access node participating in uplink page initiated paging according to example embodiments described herein.

FIG. 13A illustrates a flow diagram of example operations 1300 occurring in a UE participating in uplink page initiated paging.

Operations 1300 begin with the UE optionally receiving main device assistance (block 1305). Main device assistance may be in the form of information to help the network access node and the UE determine each other's geographical proximity or directional existence, as well as sharing paging beam information, paging resources, PO or slot information. The UE sends an uplink page before downlink synchronization completes (block 1307). The UE may send the uplink page before or during a scheduled wakeup time. The uplink page may include a preamble (such as a random access preamble), as well as a UE ID or beam ID, AU code or page cause code, and so on. The UE receives a page response (block 1309). The page response may be received during the scheduled wakeup time. The page response may be received in a downlink page. Alternatively, the downlink page serves as the page response. The UE discovers, locates, and aligns with the network access node (block 1311). The discovering, locating, and aligning with the network access node may be in accordance with information included in the page response.

FIG. 13B illustrates a flow diagram of example operations 1350 occurring in a network access node participating in uplink page initiated paging.

Operations 1350 begin with the network access node optionally receiving main device assistance (block 1355). Main device assistance may be in the form of information to help the network access node and the UE determine each other's geographical proximity or directional existence, as well as sharing paging beam information, paging resources, PO or slot information. The network access node receives an uplink page from the UE (block 1357). The uplink page may be received before or during a scheduled wakeup time. The uplink page may include a preamble (such as a random access preamble), as well as a UE ID or beam ID, AU code or page cause code, and so on. The network access node sends a page response (block 1359). The page response may be sent during the scheduled wakeup time. The page response may be included in the downlink page. Alternatively, the downlink page is used as the page response. The network access node discovers, locates, and aligns with the UE (block 1361). The discovering, locating, and aligning with the UE may be in accordance with information included in the page response.

Figures 14A, 14B:
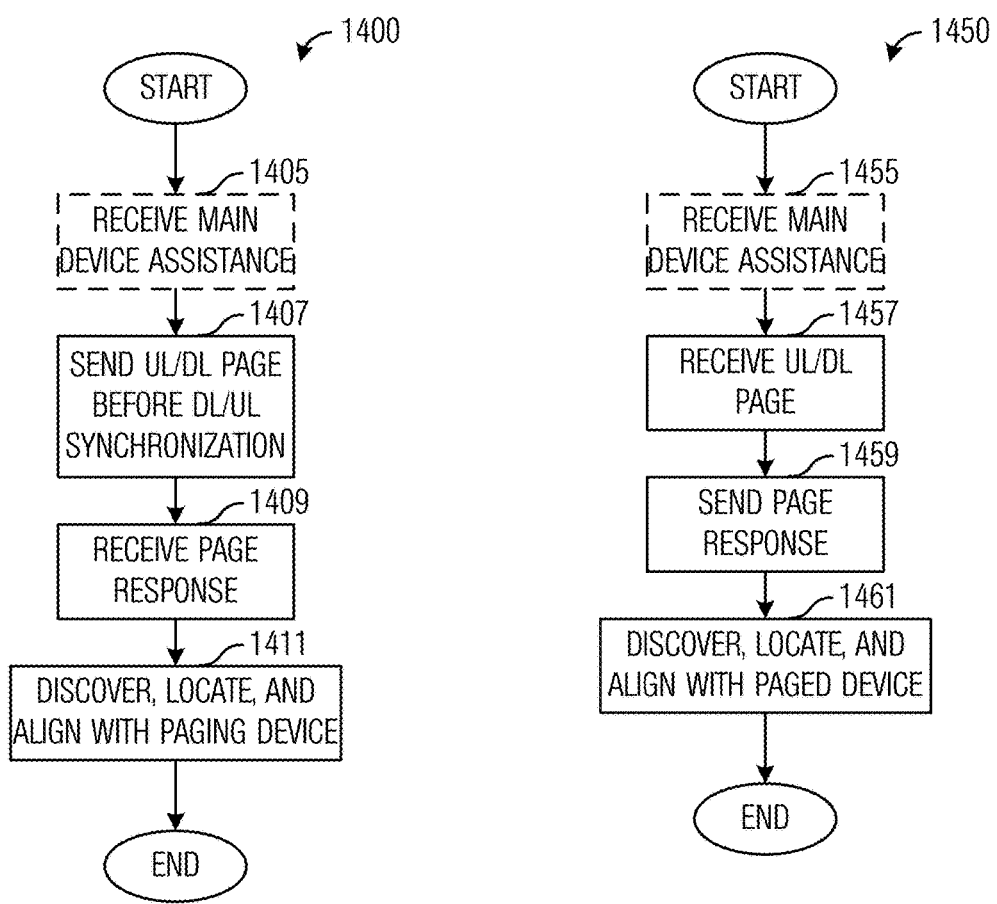
FIG. 14A illustrates a flow diagram of example operations occurring in a paged device participating in hybrid or a combination of the uplink or downlink based (or initiated) paging according to example embodiments described herein.
FIG. 14B illustrates a flow diagram of example operations occurring in a paging device participating in hybrid uplink or downlink initiated paging according to example embodiments described herein.

FIG. 14A illustrates a flow diagram of example operations 1400 occurring in a paged device participating in hybrid or a combination of the uplink or downlink based or initiated paging.

Operations 1400 begin with the paged device optionally receiving main device assistance (block 1405). Main device assistance may be in the form of information to help the paged device and a paging device determine each other's existence, as well as sharing paging beam information, paging resources, PO or slot information. The paged device sends an uplink or downlink page before downlink or uplink synchronization is achieved (block 1407). The uplink or downlink page may include a preamble (such as a random access preamble), as well as an ID or beam ID of the paged device, AU code or page cause code, and so on. The paged device receives a page response (block 1409). The page response may be received in a downlink or uplink page or the downlink or uplink page may serve as the page response. The paged device discovers, locates, and aligns with the paging device (block 1411).

FIG. 14B illustrates a flow diagram of example operations 1450 occurring in a paging device participating in hybrid uplink or downlink initiated paging.

Operations 1450 begin with the paging device optionally receiving main device assistance (block 1455). Main device assistance may be in the form of information to help the paging device and a paged device determine each other's existence, as well as sharing paging beam information, paging resources, PO or slot information. The paging device receives an uplink or downlink page from the paged device before downlink or uplink synchronization is achieved (block 1457). The uplink or downlink page may include a preamble (such as a random access preamble), as well as an ID or beam ID of the paged device, AU code or page cause code, and so on. The paging device sends a page response (block 1459). The page response may be received in a downlink or uplink page, or the downlink or uplink page may serve as the page response. The paging device discovers, locates, and aligns with the paged device (block 1461).

The uplink paging based techniques presented herein may work independently or in combination of other solutions (e.g., beam sweeping downlink paging or main channel assistance).

The main channel assistance based techniques presented herein may be embodied as, Main channel low frequency (LF) signaling in connected carrier, with secondary HF signaling, Main channel paging in inactive or idle state, with secondary channel paging and/or paging response, Main channel LF paging, with secondary channel HF paging, similar as for main channel carrier 1 with secondary channel carrier, or channel 1 with channel 2, or cell 1 with cell 2, or widebeam with narrow beam, Main channel base station, CU, DU, TRP, and so on, with secondary channel base station, CU, DU, TRP, and so forth, for downlink or uplink with uplink or downlink, or vice versa.

Main channel assistance based techniques presented herein may be used independently or together with beam sweeping based downlink paging or uplink based paging, or other orthogonal paging solutions. Main channel and secondary channel may be in the same or different RRC states.

The techniques presented herein are operable for both core network initiated paging (for UE in RRC_IDLE or RRC_INACTIVE states, for example) or RAN initiated paging (for UE in RRC_INACTIVE, for example). Similar solutions are operable for paging, tracking area update (TAU) (for UE in RRC_IDLE, for example), RAN Notification or Location area update (RNAU or RLAU) (for UE in RRC_INACTIVE, for example), as well as DRX OFF to ON transition.

Figure 15:
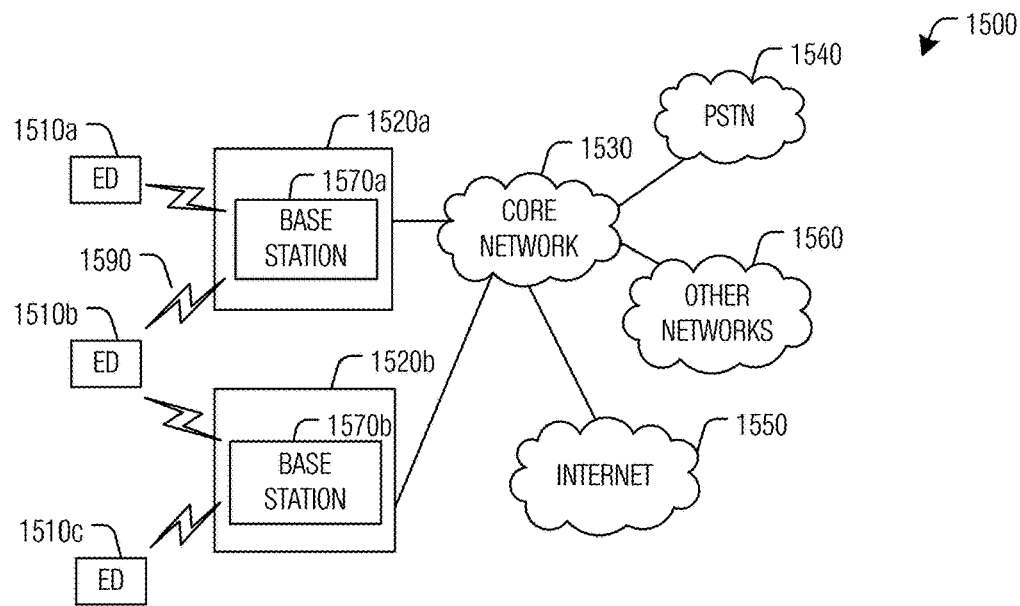
FIG. 15 illustrates an example communication system according to example embodiments described herein.

FIG. 15 illustrates an example communication system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA), etc.

In this example, the communication system 1500 includes electronic devices (ED) 1510a-1510c, radio access networks (RANs) 1520a-1520b, a core network 1530, a public switched telephone network (PSTN) 1540, the Internet 1550, and other networks 1560. While certain numbers of these components or elements are shown in FIG. 15, any number of these components or elements may be included in the system 1500.

The EDs 1510a-1510c are configured to operate or communicate in the system 1500. For example, the EDs 1510a-1510c are configured to transmit or receive via wireless or wired communication channels. Each ED 1510a-1510c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1520a-1520b here include base stations 1570a-1570b, respectively. Each base station 1570a-1570b is configured to wirelessly interface with one or more of the EDs 15100a-1510c to enable access to the core network 1530, the PSTN 1540, the Internet 1550, or the other networks 1560. For example, the base stations 1570a-1570b may include (or be) one or more of several well-known devices, such as a base transceiver station (BTS), a TRP, a gNB consisting of a CU and one or multiple DUs or TRPs, a Node-B (NodeB), an evolved NodeB (eNodeB), a Home NodeB, a Home eNodeB, a site controller, an access point (AP), or a wireless router. The RANs 1520a-1520b here may alternatively comprise logical base stations that include one or more CUs, one or more DUs, and one or more TRPs. The RANs 1520a-1520b here may alternatively comprise single dual carrier base stations with main channel and secondary channel connectivity. The EDs 1510a-1510c are configured to interface and communicate with the Internet 1550 and may access the core network 1530, the PSTN 1540, or the other networks 1560.

In the embodiment shown in FIG. 15, the base station 1570a forms part of the RAN 1520a, which may include other base stations, elements, or devices. Also, the base station 1570b forms part of the RAN 1520b, which may include other base stations, elements, or devices. Each base station 1570a-1570b operates to transmit or receive wireless signals within a particular geographic region or area, sometimes referred to as a "cell." In some embodiments, multiple-input multiple-output (MIMO) technology may be employed having multiple transceivers for each cell.

The base stations 1570a-1570b communicate with one or more of the EDs 1510a-1510c over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement 5G NR, LTE, LTE-A, or LTE-B. Of course, other multiple access schemes and wireless protocols may be utilized.

The RANs 1520a-1520b are in communication with the core network 1530 to provide the EDs 1510a-1510c with voice, data, application, Voice over Internet Protocol (VoIP), or other services. Understandably, the RANs 1520a-1520b or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510a-1510c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
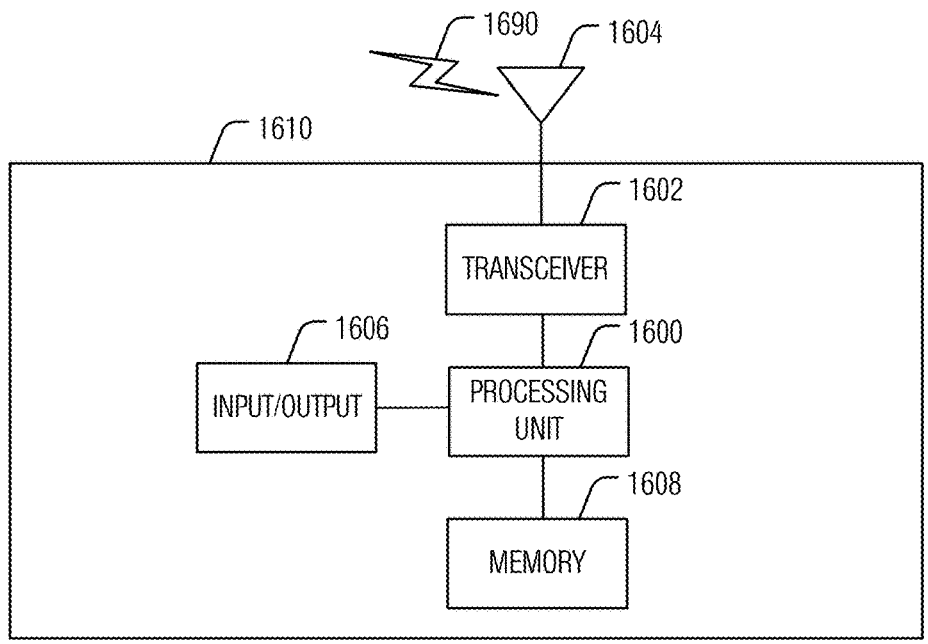
FIGS. 16A and 16B illustrate example devices that may implement the methods and teachings according to this disclosure.
Figure 16B:
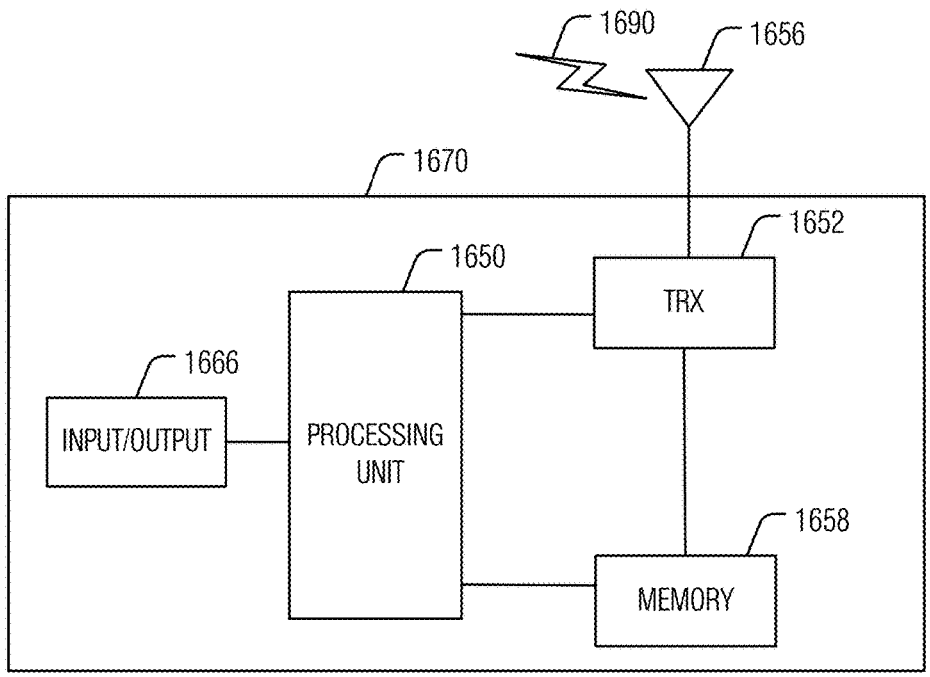

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604, but typically more than one antenna for beamforming purposes. The transceiver 1602 is also configured to demodulate data or other content received by the at least one antenna 1604. Each transceiver 1602 includes any suitable structure for generating signals for wireless or wired transmission or processing signals received wirelessly or by wire. Each antenna 1604 includes any suitable structure for transmitting or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving/providing information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station (or CU/DU/TRP with RRH) 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Figure 17:
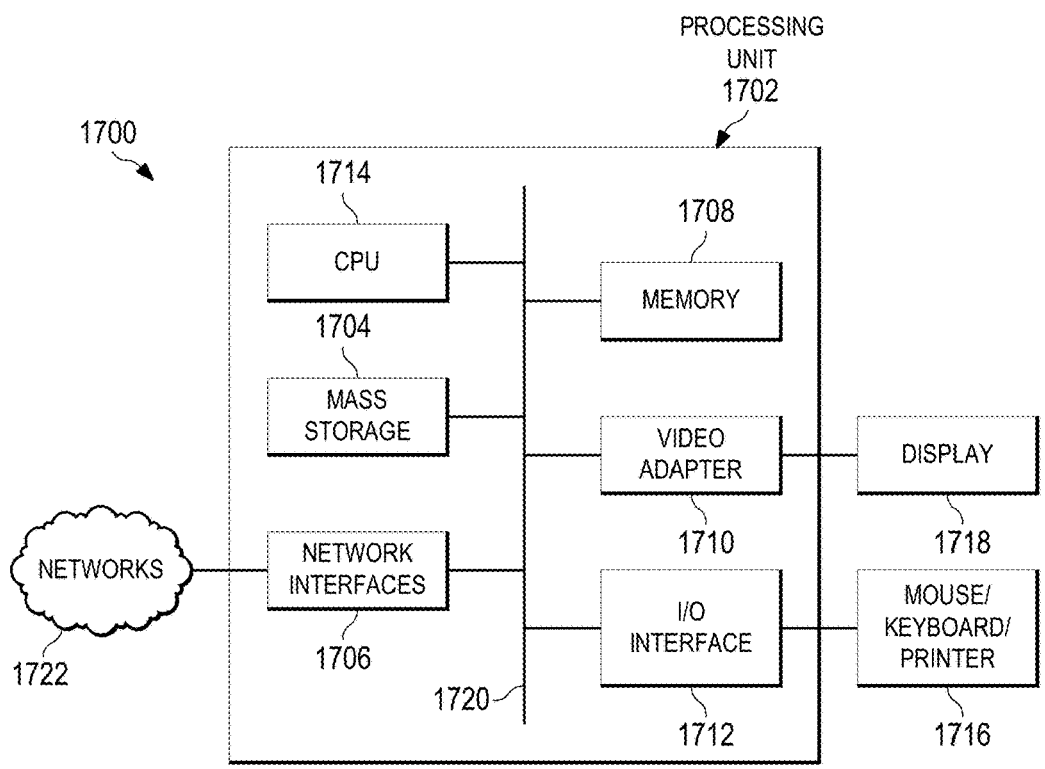
FIG. 17 is a block diagram of a computing system that may be used for implementing the devices and methods disclosed herein.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse/keyboard/printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, or wireless links to access nodes or different networks. The network interfaces 1706 allow the processing unit 1702 to communicate with remote units via the networks. For example, the network interfaces 1706 may provide wireless communication via one or more transmitters or transmit antennas and one or more receivers or receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims. The claims use paging for example, but they apply to AU and DRX OFF-to-ON transition as well.

What is claimed is:

1. A method for paging a first device by a second device, the method comprising:
   sending, by the second device to the first device, a page message over a first path between the second device and the first device, wherein the first device is in an inactive or idle state with the second device; and
   receiving, by the second device from the first device in response to the page message, a page response over a second path between the first device and the second device, wherein the second path is different from the first path in at least one of:
   a number of hops in each respective path,
   a radio access technology associated with each respective path,
   a cell associated with each respective path, or
   a width of beam pairs forming each respective path.

2. The method of claim 1, wherein the first path and the second path differ further in at least one of carrier frequency for cells anchored at the same access node, access node, radio access network, communications beam, spatial direction, communications system, number of wired or wireless connections in each path, or technology of connections in each path.

3. The method of claim 1, wherein the page response is received directly from the first device, or indirectly through a third device.

4. The method of claim 1, wherein the page message is sent in a scheduled time, frequency opportunity, a paging frame (PF) associated with the first device, a paging occasion (PO) associated with the first device, or the page message is sent in a discontinuous reception on (DRX ON) interval of the first device.

5. The method of claim 1, wherein the page message or the page response comprises one of a configuration to advertise a geographical location or existence of a third device close to the first device, select and identify the third device that will communicate with the first device, help the first and the third devices to learn each other's spatial direction or beam information, assist the paging of the first device over a third path between the first device and the third device, or assist a connection setup of the third path between the first device and the third device.

6. The method of claim 5, wherein the page message or the page response is communicated between the first device and the second device through the third device.

7. The method of claim 1, wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

8. The method of claim 7, wherein the page message or the page response further comprises information of a subset of the at least one communications beam measured or selected by the first and the second devices for the second path, or a subset of the at least one communications beam measured or selected by the first device and the third device for the third path between the first device and the third device.

9. The method of claim 1, wherein the page message includes directional or path identification information.

10. A method for operating first device paged by a second device, the method comprising:
receiving, by the first device from the second device, a page message over a first path between the second device and the first device, wherein the first device is in an inactive or idle state with the second device; and
sending, by the first device to the second device in response to the page message, a page response over a second path between the first device and the first device, wherein the second path is different from the first path in at least one of:
a number of hops in each respective path,
a radio access technology associated with each respective path,
a cell associated with each respective path, or
a width of beam pairs forming each respective path.

11. The method of claim 10, wherein the first path and the second path differ further in at least one of a carrier frequency for cells anchored at the same access node, access node, radio access network, communications beam, spatial direction, communications system, number of wired or wireless connections in each path, or technology of connections in each path.

12. The method of claim 10, wherein the second path directly connects the first device to the second device, or the second path indirectly connects the first device to the second device through a third device.

13. The method of claim 10, wherein the page message or the page response comprises one of a configuration to advertise a geographical location or existence of a third device close to the first device, select and identify the third device that will communicate with the first device, help the first and the third devices to learn each other's spatial direction or beam information, assist a paging of the first device over a third path between the first device and the third device, or assist a connection setup of the third path between the first device and the third device.

14. The method of claim 13, wherein the page message or the page response are communicated between the first device and the second device by way of the third device.

15. The method of claim 10, wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

16. The method of claim 15, wherein the page message or the page response further comprises information of a subset of the at least one communications beam measured or selected by the first and the second devices for the second path, or a subset of the at least one communications beam measured or selected by the first device and the third device for the third path between the first device and the third device.

17. The method of claim 10, wherein the page message includes directional or path identification information.

18. A method for communicating with a first device by a second device during a paging process, the method comprising:
sending, by the second device to the first device during the paging process, a message over a first path between the second device and the first device, wherein the first device is in an inactive or idle state with the second device; and
receiving, by the second device from the first device during the paging process, a response to the message over a second path between the first device and the second device, wherein at least one of the message or the response carries information including at least one of:
a geographical location of a third device,
configuration information for a third path between the first device and the third device, or
connection setup information for establishing the third path between the first device and the third device.

19. The method of claim 18, wherein the first path replaces the third path for conveying a wireless page message from the third device to the first device, and wherein the second path replaces the third path for conveying a wireless paging response from the first device to the third device.

20. The method of claim 18, wherein the first path or the second path conveys configuration information assisting completion of the paging of the first device by the third device over the third path.

21. The method of claim 18, wherein the information included in the message or the response indicates the geographical location of the third device.

22. The method of claim 18, wherein the information included in the message or the response further includes selection information of the third device.

23. The method of claim 18, wherein the information included in the message or the response further includes identification information of the third device.

24. The method of claim 18, wherein the information included in the message or the response includes the configuration information for setting up the third path between the third device and the first device.

25. The method of claim 24, wherein the configuration information indicates a radio access technology to use for communicating over the third path.

26. The method of claim 24, wherein the configuration information indicates a cell associated with the third path.

27. The method of claim 24, wherein the configuration information indicates a width of beam pairs for forming the third path.

28. The method of claim 18, wherein the information included in the message or the response includes the connection setup information for the third device that is close to the first device, or the directional information of the third device over the third path between the first device and the third device.

29. The method of claim 18, wherein the first path and the second path have a different number of hops.

30. The method of claim 18, wherein signals are communicated over the first path in accordance with a different radio access technology than signals communicated over the second path.

31. The method of claim 18, wherein the first path and the second path are formed through different cells.

32. The method of claim 18, wherein the first path is formed using a different width of beam pairs than the second path.

33. The method of claim 18, wherein the message is a page message and the response is a page response.

34. A second device adapted to page a first device comprising:
a non-transitory memory storage comprising instructions; and
one or more processors in communication with the non-transitory memory storage, wherein the one or more processors execute the instructions to:
send a page message to the first device over a first path between the second device and the first device, wherein the first device is in an inactive or idle state with the second device, and
receive, from the first device in response to the page message, a page response over a second path between the first device and the second device, wherein the second path is different from the first path in at least one of:
a number of hops in each respective path,
a radio access technology associated with each respective path,
a cell associated with each respective path, or
a width of beam pairs forming each respective path.

35. The second device of claim 34, wherein the first path and the second path differ further in at least one of a carrier frequency for cells anchored at the same access node, access node, radio access network, communications beam, spatial direction, communications system, number of wired or wireless connections in each path, or technology of connections in each path.

36. The second device of claim 34, wherein the page response is received directly from the first device, or indirectly through a third device.

37. The second device of claim 34, wherein the page message or the page response comprises one of a resource configuration to assist the paging of the first device over a third path between the first device and a third device, or a connection setup of the third path between the first device and the third device.

38. The second device of claim 34, wherein the page message or the page response comprises at least one of synchronization information of at least one communications beam used by the first and the second devices for the second path, scheduling information of the at least one communications beam used by the first and the second devices for the second path, identification information of the at least one communications beam used by the first and the second devices for the second path, or at least one communications beam used by the first device and a third device for a third path between the first device and the third device.

39. The second device of claim 38, wherein the page message or the page response further comprises information of a subset of the at least one communications beam measured or selected by the first and the second devices for the second path, or a subset of the at least one communications beam measured or selected by the first device and the third device for the third path between the first device and the third device.

40. The second device of claim 34, wherein the page message includes directional or path identification information.

41. A first device comprising:
a non-transitory memory storage comprising instructions; and
one or more processors in communication with the non-transitory memory storage, wherein the one or more processors execute the instructions to:
receive, from a second device, a page message over a first path between the second device and the first device, wherein the first device is in an inactive or idle state with the second device, and
send, to the second device in response to the page message, a page response over a second path between the first device and the second device, wherein the second path is different from the first path in at least one of:
a number of hops in each respective path,
a radio access technology associated with each respective path,
a cell associated with each respective path, or
a width of beam pairs forming each respective path.

42. The first device of claim 41, wherein the second path directly connects the first device to the second device, or the second path indirectly connects the first device to the second device through a third device.

43. The first device of claim 41, wherein the page message or the page response comprises one of a resource configuration to assist a paging of the first device over a third path between the first device and a third device, or a connection setup of the third path between the first device and the third device.

44. The first device of claim 41, wherein the page message or the page response comprises at least one of synchronization information of at least one communications beam used by the first and the second devices for the second path, scheduling information of the at least one communications beam used by the first and the second devices for the second path, or identification information of the at least one communications beam used by the first and the second devices for the second path, or at least one communications beam used by the first device and a third device for a third path between the first device and the third device.

45. The first device of claim 44, wherein the page message or the page response further comprises information of a subset of the at least one communications beam measured or selected by the first and the second devices for the second path, or a subset of the at least one communications beam measured or selected by the first device and the third device for the third path between the first device and the third device.

46. The first device of claim 41, wherein the page message includes directional or path identification information.

47. A second device adapted to communicate with a first device during a paging process, the second device comprising:
- a non-transitory memory storage comprising instructions; and
- one or more processors in communication with the non-transitory memory storage, wherein the one or more processors execute the instructions to:
  - send, to the first device during the paging process, a message over a first path between the second device and the first device, wherein the first device is in an inactive or idle state with the second device, and
  - receive, from the first device during the paging process, a response to the message over a second path between the first device to the second device, wherein at least one of the message or the response carries information including at least one of:
    - a geographical location of a third device,
    - configuration information for a third path between the first device and the third device, or
    - connection setup information for establishing the third path between the first device and the third device.

48. The second device of claim 47, wherein the first path replaces the third path for conveying a wireless page message from the third device to the first device, and wherein the second path replaces the third path for conveying a wireless paging response from the first device to the third device.

49. The second device of claim 47, wherein the first path or the second path conveys configuration information assisting completion of the paging of the first device by the third device over the third path.

50. The second device of claim 34, wherein the page message is sent in a scheduled time, frequency opportunity, a paging frame (PF) associated with the first device, a paging occasion (PO) associated with the first device, or the page message is sent in a discontinuous reception on (DRX ON) interval of the first device.

51. The second device of claim 37, wherein the page message or the page response is communicated between the first device and the second device through the third device.

52. The first device of claim 41, wherein the first path and the second path differ further in at least one of a carrier frequency for cells anchored at the same access node, access node, radio access network, communications beam, spatial direction, communications system, number of wired or wireless connections in each path, or technology of connections in each path.

53. The first device of claim 43, wherein the page message or the page response are communicated between the first device and the second device by way of the third device.

* * * * *